US007948871B2

(12) United States Patent
Balasubramanian et al.

(10) Patent No.: US 7,948,871 B2
(45) Date of Patent: May 24, 2011

(54) METHOD AND APPARATUS FOR MOBILITY AGENT RECOVERY

(75) Inventors: Chandramouli Balasubramanian, San Jose, CA (US); Vamsidhar Valluri, Fremont, CA (US); Venkatesan Pradeep, Cupertino, CA (US); Janaradan Ramesh, Saratoga, CA (US)

(73) Assignee: Ericsson AB, Stockholm (SE)

( * ) Notice: Subject to any disclaimer, the term of this patent is extended or adjusted under 35 U.S.C. 154(b) by 487 days.

(21) Appl. No.: 12/055,311

(22) Filed: Mar. 26, 2008

(65) Prior Publication Data

US 2009/0248708 A1 Oct. 1, 2009

(51) Int. Cl.
*H04J 1/16* (2006.01)
*G06F 15/16* (2006.01)
(52) U.S. Cl. .................. 370/216; 709/245
(58) Field of Classification Search .......... 709/245, 709/236, 224; 455/435.1; 370/389, 331, 370/338, 216
See application file for complete search history.

(56) References Cited

U.S. PATENT DOCUMENTS

| | | | | |
|---|---|---|---|---|
| 6,487,605 | B1 * | 11/2002 | Leung | 709/245 |
| 6,973,057 | B1 | 12/2005 | Forslow | |
| 7,539,770 | B2 * | 5/2009 | Meier | 709/236 |
| 2003/0217145 | A1 * | 11/2003 | Leung et al. | 709/224 |
| 2003/0224788 | A1 * | 12/2003 | Leung et al. | 455/435.1 |
| 2004/0032844 | A1 | 2/2004 | Lewis et al. | |

OTHER PUBLICATIONS

International Search Report and Written Opinion, Application No. PCT/US09/38464, dated Jul. 23, 2009.
Partanen, Ville, Mobile IPv4 High Availability, RFC 3344, HUT T-110.551 Seminar on Internetworking, Sjökulla, Apr. 27, 2004, 8 pages.
Cisco Systems, Cisco Mobile Wireless Home Agent Feature Guide, Cisco IOS Release 12.3(14)YX, Cisco Mobile Wireless Home Agent 3.0, Chapter 5, Dec. 22, 2005, 16 total pages. (5-1-5-14).
Ahn, Jinho, et al., "Efficient Fault-tolerant Portocol for Mobility Agents in Mobile IP," 07695-0990-8/01, © 2001, IEEE, 8 pages.
Perkins, Ed. C., "IP Mobility Support for IPv4," Network Working Group, RFC 3344, Category: Standards Track, Aug. 2002, 1-99 pages.
Glass, S., "Registration Revocation in Mobile IPv4," Sun Microsystems, Network Working Group, RFC 3543, Category: Standards Track, Aug. 2003, 1-33 pages.
Deng, H., et al., Generic Notification Message for Mobile IPv4 draft-ietf-mip4-generic-notification-message-02.txt, MIP4 Working Group, Intended Status: Standards Track, Jun. 2007, http://ietfreport.isoc.org/all-ids/draft-iett-mip4-generic-notification-message-02.text, 1-26 pages.

* cited by examiner

*Primary Examiner* — Hung T Vy
(74) *Attorney, Agent, or Firm* — Blakely, Sokoloff, Taylor & Zafman LLP

(57) ABSTRACT

Techniques for recovering Mobile Internet Protocol (IP) session(s) of a mobility agent in a Mobile IP network are described herein. In one embodiment of the invention, for each mobility session associated with a mobility agent, the mobility agent distributively backs up mobility agent specific information to the mobility agent peer associated with that mobility session. The mobility agent specific information is not used by the mobility agent peer. Upon the mobility agent inadvertently losing at least one mobility session, the mobility agent recovers the stored mobility agent specific information associated with those sessions from the mobility agent peers respectively associated with those sessions. Other methods and apparatuses are also described.

9 Claims, 9 Drawing Sheets

METHOD AND APPARATUS FOR MOBILITY AGENT RECOVERY

BACKGROUND

1. Field

Embodiments of the invention relate to the field of Mobile IP; and more specifically, to recovering mobility agent information.

2. Background

Mobile IP is a protocol described in Request for Comments 3344, August 2002, which allows laptop computers or other mobile computing units (referred to as mobile nodes herein) to roam between various sub-networks at various locations, while maintaining Internet and/or WAN connectivity. Mobility agents (e.g., home agent, foreign agent) provide Mobile IP functionality. In a typical Mobile IP network, each mobile node is identified by its home address (assigned by a home agent), regardless of its current point of attachment to the Internet. While situated away from its home, a mobile node is also associated with a care-of address (provided by a foreign agent), which indicates its current point of attachment for reachability. While a mobile node is away from its home and connected to a foreign network it requests registration through the foreign agent to the home agent. If the registration is successful, when the mobile node's home network receives packets addressed to the mobile node, the home agent will send those packets, over a tunnel, to the foreign agent which in turns forwards the packets to the mobile node. When the mobile node is sending packets, the foreign agent may employ reverse-tunneling and send the packets to the home agent who in turn forwards the packets to their destination, or the foreign agent may directly forward the packets to their destinations. When the mobile node is successfully registered, the mobile node has started a Mobile IP session. When the mobile node is deregistered (e.g., the bindings for the mobile node have been removed), the Mobile IP session has ended. Typically, if a mobility agent restarts, the mobility bindings stored in the mobility agent is lost.

The Mobile IP protocol describes communicating control messages between the mobility agents. For example during registration of a mobile node, a Mobile IP registration request message and a Mobile IP registration reply message are typically transmitted between a foreign agent and a home agent. At any given time a mobility agent (either a foreign agent or the home agent) may stop providing service to the mobile node. The mobility agent that wishes to stop providing service may send a registration revocation message, described in Request for Comments 3543, August 2003, to the peered mobility agent (e.g., a foreign agent may send a registration revocation message to the home agent). The revocation message informs the receiving mobility agent that the sending mobility agent is stopping service to the mobile node. The mobility agent that receives the registration revocation message associated with a mobile node may remove the mobility bindings for that mobile node.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
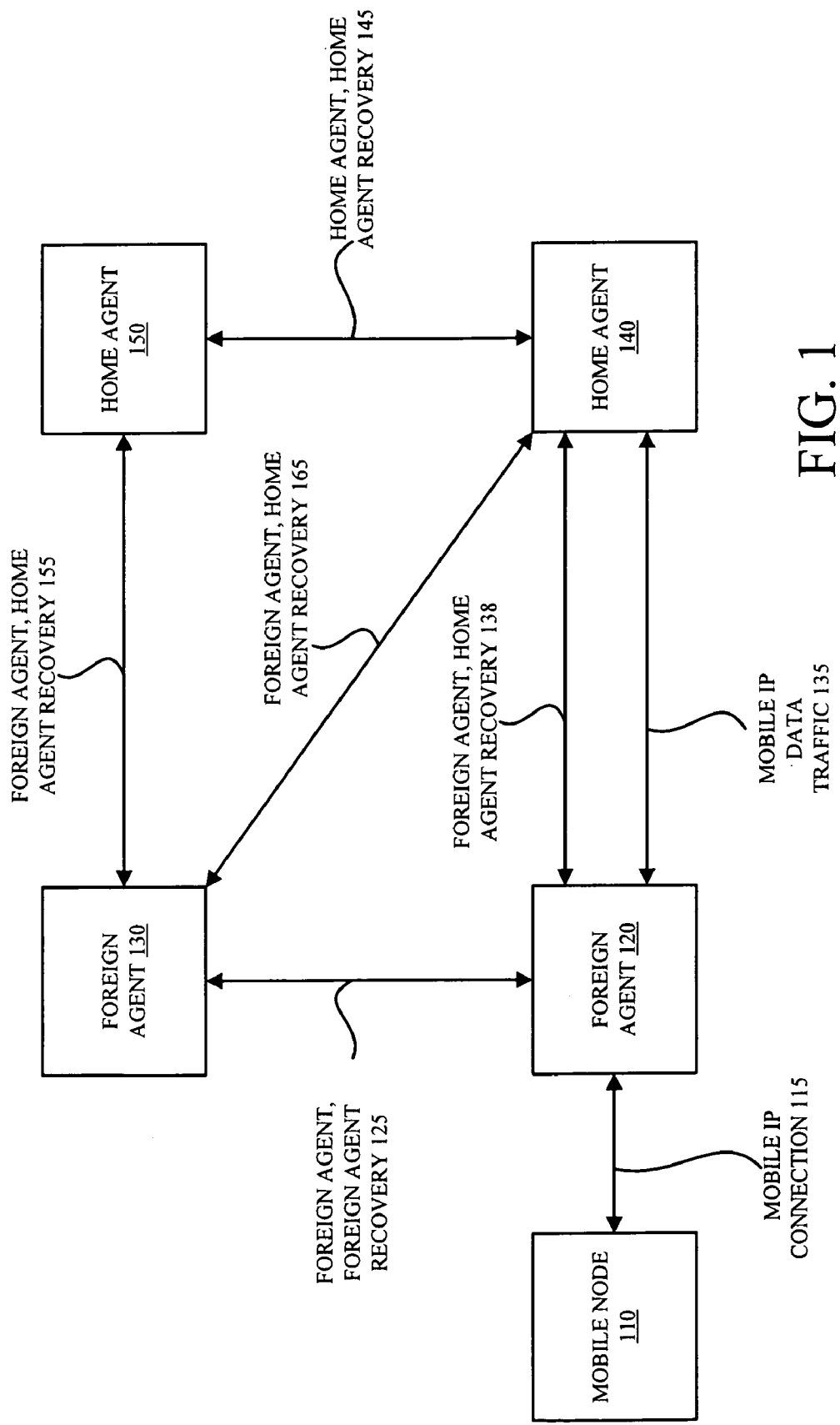
FIG. 1 illustrates an exemplary Mobile IP network supporting Mobile IP session recovery according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more electronic devices (e.g., a computer, a network element, etc.). As used herein, a network element (e.g., a router, switch, bridge, etc.) is a piece of networking equipment, including hardware and software that communicatively interconnects other equipment on the network (e.g., other network elements, computer end stations, etc.) Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Techniques for recovering Mobile Internet Protocol (IP) session(s) of a mobility agent in a Mobile IP network is described. In one embodiment of the invention, for each mobility session associated with a mobility agent, the mobility agent distributively backs up mobility agent specific information to the mobility agent peer associated with that mobility session. The mobility agent specific information is not used by the mobility agent peer. Upon the mobility agent inadvertently losing at least one mobility session, the mobility agent recovers the stored mobility agent specific information associated with those sessions from the mobility agent peers respectively associated with those sessions.

FIG. 1 illustrates an exemplary Mobile IP network with mobility agents that support Mobile IP session recovery (hereinafter "recovery"). In FIG. 1, a mobile node 110 is coupled with a foreign agent 120 over a Mobile IP connection 115. Thus, a Mobile IP session for the mobile node 110 exists at the foreign agent 120 (e.g., a foreign agent type mobility session) and the foreign agent 120 stores Mobile IP information associated with the mobile node 110 specific to that foreign agent. According to one embodiment of the invention, the mobile node is anchored at the home agent 140. Thus, a Mobile IP session for the mobile node 110 exists at the home agent 140 (e.g., a home agent type mobility session) and the home agent 140 stores Mobile IP information associated with the mobile node 110 specific to that home agent. The foreign agent 120 is coupled with the home agent 140. Mobile IP data traffic 135 is carried on a communication link between the foreign agent 120 and the home agent 140. For example, the Mobile IP data traffic 135 is carried on a tunnel coupling the foreign agent 120 and the home agent 140. According to one embodiment of the invention, the foreign agent 120 and the home agent 140 are capable of recovering their mobility agent states as designated by the foreign agent, home agent recovery 138 as described later herein.

The foreign agent 120 is also coupled with the foreign agent 130. According to one embodiment of the invention the foreign agent 130 is a backup foreign agent for the foreign agent 120. According to another embodiment of the invention the foreign agent 130 is a recovery partner of the foreign agent 120, which is described later herein. The foreign agent 120 and the foreign agent 130 are capable of recovering their mobility agent states as designated by the foreign agent, foreign agent recovery 125 as described later herein.

The home agent 140 is also coupled with the home agent 150. According to one embodiment of the invention the home agent 150 is a backup home agent for the home agent 140. According to another embodiment of the invention the home agent 150 is a recovery partner of the home agent 140, which is described later herein. The home agent 140 and the home agent 150 are capable of recovering their mobility agent states as designated by the home agent, home agent recovery 145 as described later herein. Additionally, according to one embodiment of the invention the home agent 140 and the foreign agent 130 are capable of recovering their mobility agent states as designated by the foreign agent, home agent recovery 165.

The foreign agent 130 is also coupled with the home agent 150. According to one embodiment of the invention the foreign agent 130 is a peer of the home agent 150. For example, the foreign agent 130 is providing foreign agent functionality for the home agent 150. The foreign agent 130 and the home agent 150 are capable of recovering their mobility agent states as designated by the foreign agent, home agent recovery 155.

According to one embodiment of the invention, to recover their mobility agent states (e.g., Mobile IP session information, additional information pertaining to the mobile nodes (e.g., QoS parameters, traffic filters, security parameters, access control lists, load balancing attributes, etc.)), the mobility agents exchange recovery messages. The recovery messages are in a request/response format with support for reliability. For example, in one embodiment of the invention only established sessions may be recovered. Reliability is achieved using sequence numbers and acknowledgement of the sequence numbers from the mobility agent peer. According to one embodiment of the invention a recovery message has a UDP header followed by the following format:

```
 0                   1                   2                   3
 0 1 2 3 4 5 6 7 8 9 0 1 2 3 4 5 6 7 8 9 0 1 2 3 4 5 6 7 8 9 0 1
```

| Type | Subtype | MD | A|R|V|C | Rsvd |
|---|---|---|---|---|
| Sender Address ||||| 
| Receiver Address ||||| 
| Identification ||||| 
| Extensions... |||||

The Type field indicates that this is a recovery message. For example, the bits in the Type field may indicate RECOVERY. The Subtype field describes the type of recovery subtype that is carried in the message. For example, the subtype field may indicate that a Hello message, a capability negotiation (which may be a capability negotiation request or capability negotiation reply), a bulk session recovery request, a single session recovery request, a bulk session recovery response, or a single session recovery response is carried in the particular message. Note that it should be understood that the subtype field may be used to communicate different, less, or additional subtypes depending on differing functionalities or applications (e.g., QoS parameters, security parameters, load balancing attributes, etc.).

The MD field defines the message direction of the recovery message. For example, according to one embodiment of the invention if the MD field has a value of 0, the message was sent from a home agent to a foreign agent. If the MD field has a value of 1, the message was sent from a foreign agent to a home agent. If the MD field has a value of 2, the message was sent from one home agent to another home agent. If the MD field has a value of 3, the message was sent from one foreign agent to another foreign agent. Of course it should be understood that the above values are arbitrary and any of above values may be switched with another value.

The "A" bit indicates whether the recipient of the recovery message must acknowledge the recovery message according to one embodiment of the invention. For example, if the "A" bit is set to 1, an acknowledgement is required. If the "A" bit is set to 0, the acknowledgement is optional. It should be understood that while acknowledgement messages increase reliability, they also increase the amount of bandwidth that is used.

According to one embodiment of the invention, the "R", "V", and "C" bits indicate a particular action that the recipient should perform upon receiving the recovery message. For example, the "R" bit indicates whether Mobile IP session information (e.g., Mobile IP records from a Mobile IP structure) is to be recovered (e.g., whether a Mobile IP needs to be reacquired). For example, if the "R" bit is set to 1, Mobile IP information needs to be recovered. If the "R" bit is set to 0, Mobile IP information does not need to be recovered. The recover action is discussed in greater detail with reference to FIGS. 2, 3, and 9. The "V" bit indicates whether Mobile IP session information is to be verified. For example, if the "V" bit is set to 1 Mobile IP session information needs to be verified. If the "V" bit is set to 0 Mobile IP session information does not need to be verified. The verification action is discussed in greater detail with reference to FIGS. 3, 6, and 9.

The "C" bit indicates whether Mobile IP information is to be cleared. For example, if the "C" bit is set to 1 Mobile IP information needs to be cleared. If the "C" bit is set to 0 Mobile IP information does not need to be cleared. Clearing Mobile IP information is discussed in greater detail with reference to FIGS. 3, 4, and 5.

The Reserved field is sent with a value of 0 and is ignored when received. The Sender Address field includes the address of the sender (e.g., the IP address of the sender). The Receiver Address field includes the address of the receiver (e.g., the IP address of the mobility agent peer receiving this message). The Identification field is a 64 bit number constructed by the sending mobility agent used for matching recovery messages with a RECOVERY response and for protecting against replay attacks of notification messages. A portion of the Identification field may also be used as a sequence number.

The extensions field may extend the functionality of the recovery message format. One or more extensions may be used with this recovery message as well as one or more authentication extensions as defined in RFC 3344. For example, according to one embodiment of the invention the following extensions may be included in the extensions field of a recovery message format: capability negotiation extensions, bulk session recovery request extensions, single session recovery request extensions, bulk session recovery reply extensions, and single session recovery reply extensions.

According to one embodiment of the invention a mobility agent may negotiate one or more capabilities with another mobility agent. A capability represents a particular set of one or more operations providing functionality of an application feature. If each mobility agent supports that capability the mobility agents may send messages relative to that capability (i.e., the mobility agents may make use of that capability). For example, mobility agents may negotiate a hello protocol capability, which when negotiated allows the hello application feature to be used. For example, a negotiated hello capability allows a hello packet to be sent between mobility agents in a recovery message format. Further examples of capabilities that mobility agents may negotiate includes: Mobile IP session recover capability, Mobile IP session verify capability, and/or Mobile IP session clear capability. It should be understood that the above examples are exemplary as there may be many other capabilities that may be negotiated. Furthermore, additional information may be transmitted through recovery messages (e.g., QoS parameters, security attributes (e.g., AAA parameters), load balancing capabilities, rate policies, etc.).

According to one embodiment of the invention, the capability negotiation extension takes the following format:

```
 0                   1                   2                   3
 0 1 2 3 4 5 6 7 8 9 0 1 2 3 4 5 6 7 8 9 0 1 2 3 4 5 6 7 8 9 0 1
```

| Type | Length |
|---|---|
| OPT | Capabilities Supported |
| Hello Interval | Dead Interval |
| Recovery Modes | Recovery Types |
| Recovery Actions | Options |

The Type field indicates the type of extension, which in this case indicates that this is a capability negotiation extension. The Length field is the total length of the extension. The OPT field indicates whether any options are present in the extension. The Capabilities Supported field indicates which capabilities the transmitting mobility agent (i.e., the mobility agent sending the capability negotiation extension) supports. Thus, with this information the receiving mobility agent may compare those capabilities with the capabilities that it supports. For example, the value 0x001 in the Capabilities Supported field indicates that the hello protocol capability is supported. The value 0x002 indicates that different recovery modes are supported; the value 0x004 indicates that different recovery types are supported, and the value 0x008 indicates that different recovery actions are supported. It should be understood that additional values are contemplated by the invention depending on different capabilities supported by the mobility agents.

The Hello Interval field is an amount of time until sending the next hello packet. The Dead Interval field is a multiple of the Hello Interval within which the receiving mobility agent (e.g., the peer mobility agent) has to send the hello packet back to the transmitting mobility agent before being declared as dead. The Recovery Modes field indicates whether a periodic recovery capability is supported and/or an event based recovery capability is supported. For example, in the periodic mode, a recovery message is sent at some predetermined time interval (e.g., once a day, once an hour, etc.). In contrast, in the event based mode, a recovery message is sent as a result of a dynamic event (e.g., mobility agent restart, Mobile IP session conflict, administrative events (e.g., network administrator removing mobility bindings), irrecoverable events, a hello packet with a sequence number less than 255, etc.).

The Recovery Types field indicates whether a bulk session recovery is supported (e.g., recovering more than one Mobile IP session in a single recovery message) and/or whether a single session recovery is supported according to one embodiment of the invention. For example, upon a mobility agent restarting, that mobility agent will likely want to send a recovery message regarding every Mobile IP session (e.g., each Mobile IP record) that existed on the mobility agent before the restart occurred; thus a bulk session recovery type is appropriate. On the other hand, if a mobile node has moved from one foreign agent to another foreign agent, the home agent may direct the old foreign agent to clear its Mobile IP session information regarding that mobile node; thus only that particular Mobile IP session is affected, in which case a single session recovery type may be appropriate. According to one embodiment of the invention, a reliable channel (e.g., TCP, STCP, etc.) may be used to carry bulk Mobile IP session information. According to one embodiment of the invention, support for using the reliable channel is negotiated during capabilities negotiation.

The Recovery Actions field indicates the type of action that is supported by the mobility agent. For example, the Recovery Action field may indicate that Mobile IP session verify, Mobile IP session recover, and/or Mobile IP session clear are supported. The Options field indicates whether there are options present in the extension. Processing modules and data structures (e.g., storage of the existence and capabilities of peers) are described later herein.

As previously described, the recovery messages are in a request/response format. According to one embodiment of the invention, a mobility agent may request bulk session recovery for a specific network prefix or for a network access identifier (NAI) partial string (e.g., user or domain). For example, a bulk session recovery request extension for a network prefix may have the following format:

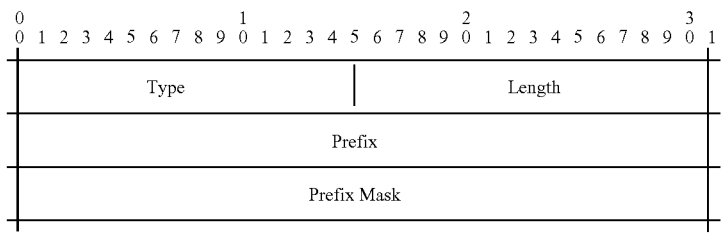

A bulk session recovery request extension for a NAI substring may have the following format:

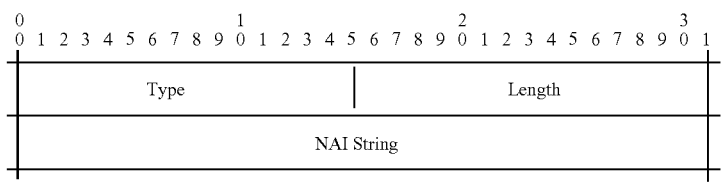

According to one embodiment of the invention a mobility agent may request a single session recovery. A single session recovery request must uniquely identify a Mobile IP session (e.g., NAI, Home Address (HoA), session creation timestamp, etc.). For example, a single session recovery request extension may have the following format:

```
 0                   1                   2                   3
 0 1 2 3 4 5 6 7 8 9 0 1 2 3 4 5 6 7 8 9 0 1 2 3 4 5 6 7 8 9 0 1
+---------------------------------------------------------------+
|             Type              |           Length              |
+---------------------------------------------------------------+
|                         Home Address                          |
+---------------------------------------------------------------+
|                          Timestamp                            |
+---------------------------------------------------------------+
|          NAI Length           |           NAI...              |
+---------------------------------------------------------------+
|                          Options...                           |
+---------------------------------------------------------------+
```

According to one embodiment of the invention a mobility agent may respond with a bulk session recovery response. The bulk session recovery response may include information regarding multiple Mobile IP sessions. A template-based format may be used when sending the Mobile IP information. For example, in the case of sending Mobile IP database records, each packet may have a template TLV (type, length, value) which lists the order and type of fields that are included for each record so that each field need not be encoded as an independent TLV. For example, a bulk session recovery reply extension may take the following format:

According to an embodiment of the invention a mobility agent may respond to a recovery message with a single session recovery response message. A single session recovery response must uniquely identify a Mobile IP session (e.g., NAI, Home Address (HoA), session creation timestamp, etc.). For example, a single session recovery response extension may have the following format:

```
 0                   1                   2                   3
 0 1 2 3 4 5 6 7 8 9 0 1 2 3 4 5 6 7 8 9 0 1 2 3 4 5 6 7 8 9 0 1
+---------------------------------------------------------------+
|             Type              |           Length              |
+---------------------------------------------------------------+
|                         Home Address                          |
+---------------------------------------------------------------+
|                          Timestamp                            |
+---------------------------------------------------------------+
|          NAI Length           |           NAI...              |
+---------------------------------------------------------------+
|                          Options...                           |
+---------------------------------------------------------------+
```

It should be understood that the above extensions (e.g., capability negotiation extensions, bulk session recovery request extensions, single session recovery request extensions, bulk session recovery response extensions, and single session recovery response extensions) may be included as part of the registration of a mobile node. For example, the capabilities negotiation extension may be included in the usual Mobile IP registration request/reply messages as defined in RFC 3344 and/or Mobile IP registration revocation messages as defined in RFC 3543. It should be understood that the above message formats are exemplary and others are within the scope of the invention.

```
 0                   1                   2                   3
 0 1 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+
|             Type              |           Length              |
+-+-+-+-+-+-+-+-+-+-+-+-+-+-+-+-+-+-+-+-+-+-+-+-+-+-+-+-+-+-+-+
|T|       Template ID           |        Template Length        |
+-+-+-+-+-+-+-+-+-+-+-+-+-+-+-+-+-+-+-+-+-+-+-+-+-+-+-+-+-+-+-+
|           Field 1 type        |         Field 1 Length        |
+-+-+-+-+-+-+-+-+-+-+-+-+-+-+-+-+-+-+-+-+-+-+-+-+-+-+-+-+-+-+-+
|           Field 2 type        |         Field 2 Length        |
+-+-+-+-+-+-+-+-+-+-+-+-+-+-+-+-+-+-+-+-+-+-+-+-+-+-+-+-+-+-+-+
|              ...              |                               |
+-+-+-+-+-+-+-+-+-+-+-+-+-+-+-+-+-+-+-+-+-+-+-+-+-+-+-+-+-+-+-+
|T|        Record SetID         |        Record Set Length      |
+-+-+-+-+-+-+-+-+-+-+-+-+-+-+-+-+-+-+-+-+-+-+-+-+-+-+-+-+-+-+-+
|       Record 1 Field 1 Value  |     Record 1 Field 2 Value    |
+-+-+-+-+-+-+-+-+-+-+-+-+-+-+-+-+-+-+-+-+-+-+-+-+-+-+-+-+-+-+-+
|              ...              |                               |
+-+-+-+-+-+-+-+-+-+-+-+-+-+-+-+-+-+-+-+-+-+-+-+-+-+-+-+-+-+-+-+
|       Record 2 Field 1 Value  |     Record 2 Field 2 Value    |
+-+-+-+-+-+-+-+-+-+-+-+-+-+-+-+-+-+-+-+-+-+-+-+-+-+-+-+-+-+-+-+
|              ...              |                               |
+-+-+-+-+-+-+-+-+-+-+-+-+-+-+-+-+-+-+-+-+-+-+-+-+-+-+-+-+-+-+-+
```

The "T" bit indicates whether the record is a template or a session record. The Template ID field is a unique identifier for the current recovery transaction. The Record SetID field is an identifier that matches the identifier in the template ID field. According to one embodiment of the invention session records are deciphered based on the template matching the identifier in the template ID field.

Figure 2:
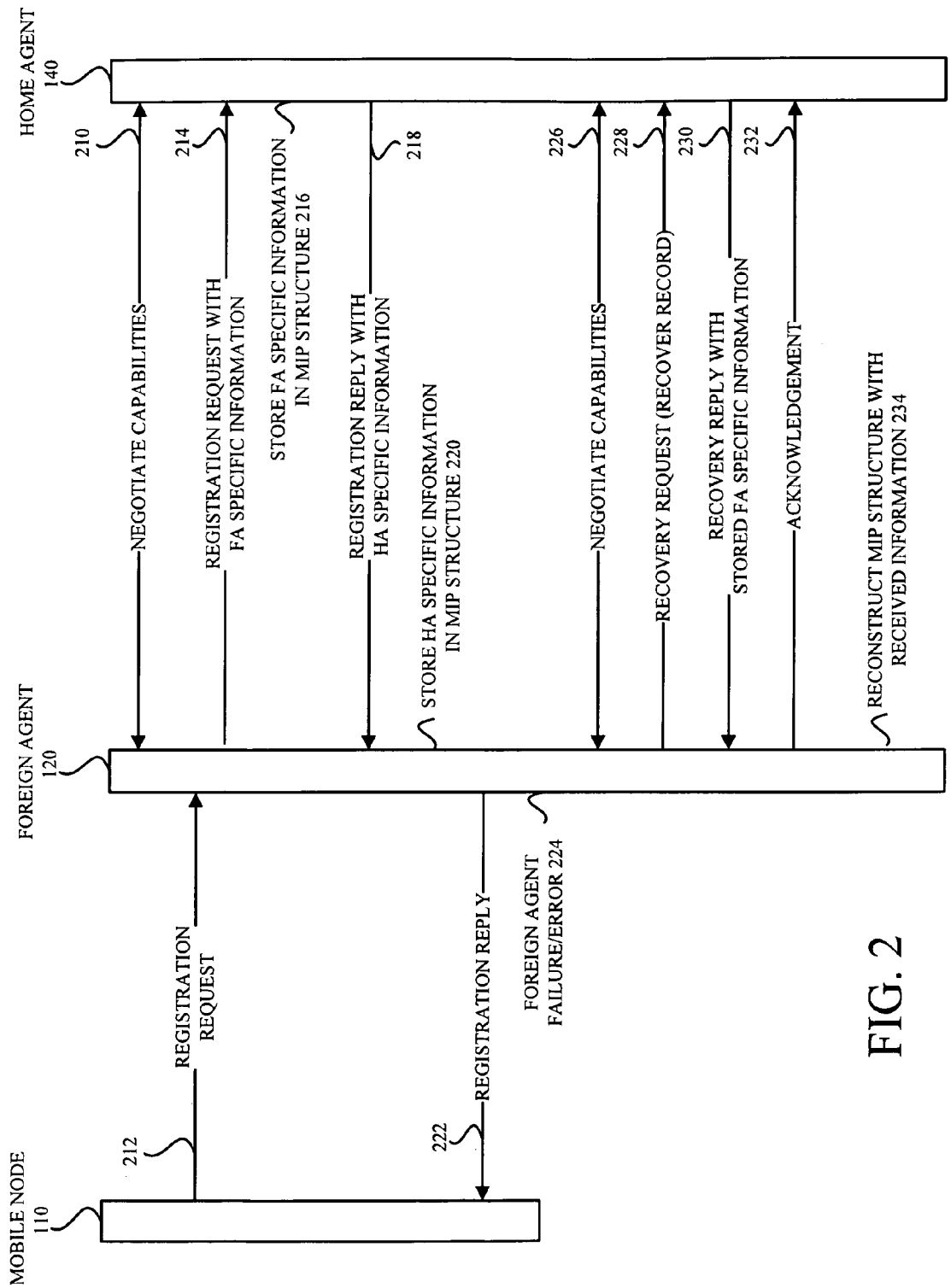
FIG. 2 is a data flow diagram illustrating Mobile IP session recovery of a foreign agent according to one embodiment of the invention.

FIG. 2 is a data flow diagram illustrating Mobile IP session recovery of a foreign agent according to one embodiment of the invention. The operations of FIG. 2 will be described with reference to the exemplary embodiment of FIGS. 8 and 9. However, it should be understood that the operations of FIG. 2 can be performed by embodiments of the invention other than those discussed with reference to FIGS. 8 and 9, and the embodiments discussed with reference to FIGS. 8 and 9 can perform operations different than those discussed with reference to FIG. 2.

Figure 8:
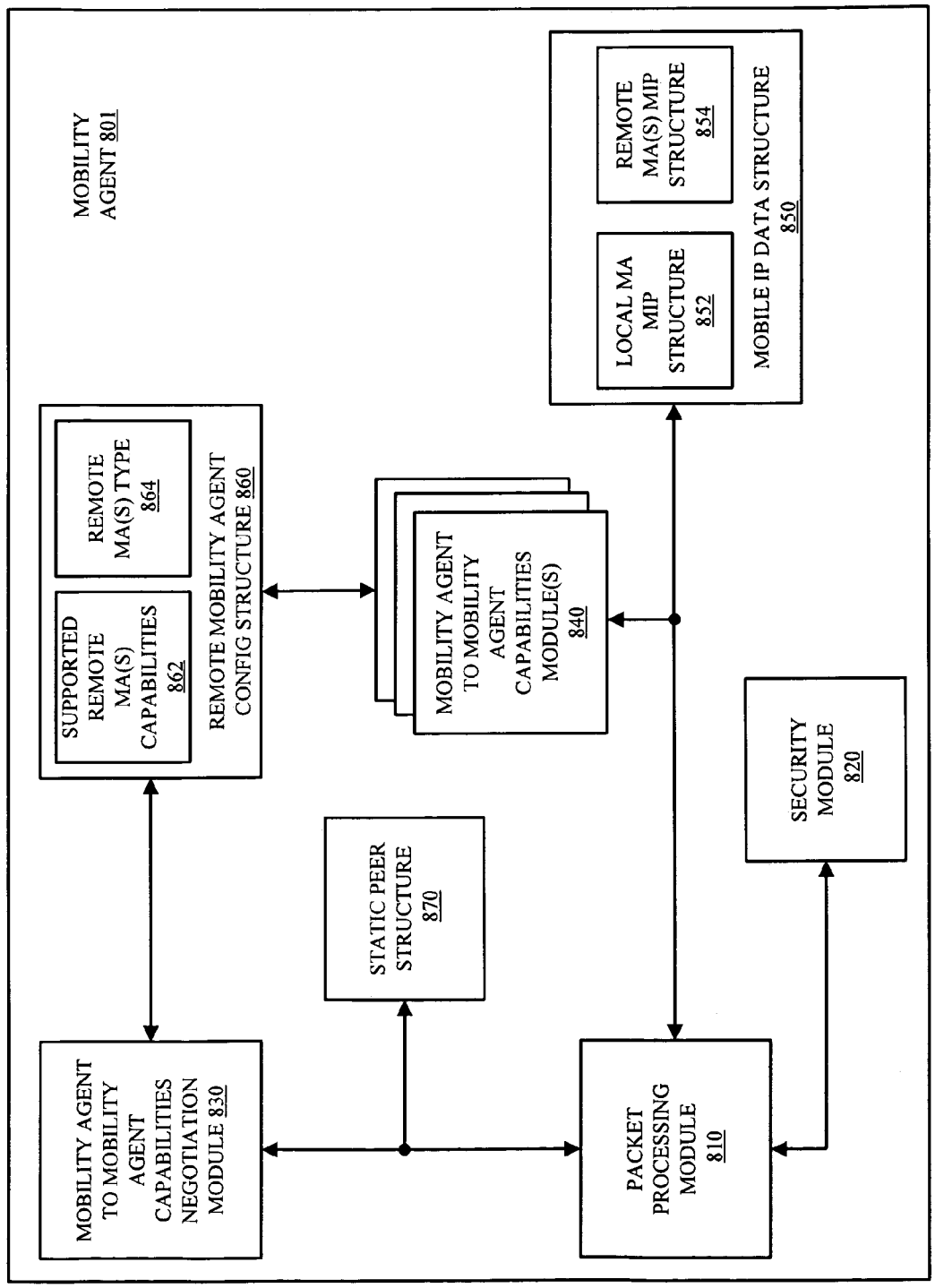
FIG. 8 illustrates an exemplary mobility agent configured to support Mobile IP session recovery according to one embodiment of the invention.

FIG. 8 illustrates an exemplary mobility agent configured to support Mobile IP session recovery according to one embodiment of the invention. The mobility agent 801 represents foreign agents and home agents (i.e., the mobility agent 801 may be a foreign agent or a home agent). Additionally, the mobility agent 801 may be one of a multiple of instances of mobility agents within a single network element. Referring back to FIG. 1, the foreign agents 120 and 130, and the home agents 140 and 150 are each represented by the mobility agent 801. The mobility agent 801 includes the packet processing module 810, the security module 820, the mobility agent to mobility agent capabilities negotiation module 830, the mobility agent to mobility agent capabilities modules 840, the Mobile IP data structure 850 (which includes a local mobility agent Mobile IP structure 852 and remote mobility agent(s) Mobile IP structure 854), a remote mobility agent configuration structure 860 (which includes supported remote mobility agent(s) capabilities 862 and remote mobility agent(s) type 864), and static remote mobility agent structure 870.

The packet processing module 810 is responsible for processing packets received and sent by the mobility agent 801. The security module 820 is used during authentication of messages and of the mobile nodes (e.g., through use of AAA). The mobility agent to mobility agent capabilities module(s) 840 provides functionality for the recovery capabilities the mobility agent 801 supports. For example, the mobility agent to mobility agent capabilities module(s) 840 include new message types for certain ones of the capabilities. As previously described, a capability represents a particular set of one or more operations providing functionality of an application feature. For example, a capability may include a capability to recover Mobile IP sessions without use of high availability (which will be described in detail later herein). Typical high availability schemes require that the mobility agent (e.g., a primary mobility agent) be able to quickly switch over to a standby mobility agent upon a failure. The standby mobility agent requires redundant storage, redundant processing modules, redundant control cards and/or line cards, switchover support, etc. The standby mobility agent may be remotely located from the primary mobility agent, or located within the same network element as the primary mobility agent. Thus, it should be understood that high availability is expensive and certain mobility agents in a Mobile IP network need not support high availability.

The mobility agent to mobility agent capabilities negotiation module 830 negotiates the capabilities between mobility agents (e.g., through capabilities request/capabilities reply messages). The mobility agent to mobility agent capabilities negotiation module 830 includes support for the new type of negotiation messages. For example, the previously described negotiation extension message type is supported by the mobility agent to mobility agent capabilities negotiation module 830. The remote mobility agent configuration structure 860 is to store configuration information about remote mobility agents (e.g., backup mobility agents and/or peered mobility agents) that are coupled to the mobility agent 801. The supported remote mobility agent(s) capabilities 862, coupled to the mobility agent to mobility agent capabilities negotiation module 830, is a structure that identifies the capabilities a remote mobility agent supports. The remote mobility agent(s) type 864 is a data structure that identifies the type of remote mobility agent (e.g., backup and/or peer). According to one embodiment of the invention the supported remote mobility agent(s) capabilities 862 and the remote mobility agent(s) type 864 are the same structure. The type and supported capabilities of a remote mobility agent may determine the action included in a recovery message the mobility agent 801 sends to, or receives from, that remote mobility agent.

The Mobile IP data structure 850 is to store Mobile IP information of the mobility agent 801 in the local mobility agent Mobile IP structure 852 and Mobile IP information from remote mobility agent(s) in the remote mobility agent(s) Mobile IP structure 854. The remote mobility agent(s) Mobile IP structure 854 may store Mobile IP information from various remote mobility agents and/or other additional information pertaining to mobile nodes associated with the remote mobility agents (e.g., a QoS information for that mobile node, traffic filters for that mobile node, access control lists of that mobile node, etc.). In the case of the mobility agent 801 being a foreign agent, the local mobility agent Mobile IP structure 852 may be a visitor structure. In the case of the mobility agent 801 being a home agent, the local mobility agent Mobile IP structure 852 may be a binding structure. According to one embodiment of the invention the local mobility agent Mobile IP structure 852 and the remote mobility agent(s) Mobile IP structure 854 are the same structure.

In FIG. 2, the mobile node 110 is coupled with the foreign agent 120, and the foreign agent 120 is coupled with the home agent 140. Thus, the mobile node 110 is anchored at the home agent 140 and is within the foreign network of the foreign agent 120. The foreign agent 120 and the home agent 140 are mobility agent peers. At operation 210, the home agent 140 and the foreign agent 120 negotiate capabilities. For example, referring to FIG. 8, the mobility agent to mobility agent capabilities negotiation module 830 on the foreign agent 120 and the home agent 140 is used to negotiate capabilities. If the foreign agent 120 and the home agent 140 each support the Mobile IP session recover capability, each of the mobility agents include a recovery capability module as one of the mobility agent to mobility agent capabilities modules 840 according to one embodiment of the invention. Additionally, the supported remote mobility agent(s) capabilities 862 of the foreign agent 120 and the home agent 140 store information indicating whether the home agent 140 and the foreign agent 120 support recover Mobile IP capability respectively. Additionally, the remote mobility agent(s) type structure 864 of the foreign agent 120 and the home agent 140 stores information regarding the type of mobility agent the home agent 140 and the foreign agent 120 are respectively. For example, the remote mobility agent(s) type structure 864 of the foreign agent 120 indicates that the home agent 140 is a mobility agent peer.

According to one embodiment of the invention, if a mobility agent supports Mobile IP session recover capability, the mobility agent is capable of storing, in the remote mobility agent(s) Mobile IP structure 854, Mobile IP information and/or additional mobile node information associated with remote mobility agents. In addition, if a mobility agent supports Mobile IP session recover capability, the mobility agent is capable of transmitting local Mobile IP information and/or additional local mobile node information.

According to one embodiment of the invention, the Mobile IP session recover capability is negotiated by piggybacking on the usual registration request and registration reply messages as defined in RFC 3344. In other words, the Mobile IP session recover capability is included in the extensions field of the usual registration request/reply messages. For example, upon the first registration request the foreign agent 120 forwards to the home agent, on behalf of a requesting mobile node, the usual registration request to the home agent 140 and piggybacks the Mobile IP session recover capability with that registration request. Similarly, the home agent 140, when transmitting a registration reply, may piggyback the recover Mobile IP capability with the registration reply message. According to another embodiment of the invention, the Mobile IP session recover capability is negotiated by a recovery message as described previously.

Referring back to FIG. 2, after the Mobile IP session recover capability has been negotiated, some time later at operation 212 the foreign agent 120 receives a usual registration request from the mobile node 110. In addition to processing the registration request as usual (e.g., the packet processing module 810 authenticating the mobile node with use of the security module 820 and making a record for the mobile node in the local mobility agent Mobile IP structure 852), the foreign agent 120 forwards the registration request to the home agent 140 and piggybacks recovery data in the format of foreign agent specific information at operation 214. The foreign agent specific information is opaque information (i.e., the foreign agent specific information is useful only for the specific implementation of that particular foreign agent). The foreign agent specific information includes all necessary information required for restoration of one or more Mobile IP sessions. In other words, if the foreign agent 120 inadvertently or unexpectedly loses information in its local mobility agent Mobile IP structure, the foreign agent specific information includes the information to rebuild the records in that structure. The foreign agent specific information may include the access interface associated with the mobile node, an identifier of the mobile node (e.g., MAC address, NAI, IP address), layer 2 information, layer 3 information, session username, timestamps, implementation specific information, security information (e.g., AAA), etc. Additionally, the foreign agent specific information may include additional information pertaining to the mobile node it is providing Mobile IP services for (e.g., QoS information for that mobile node, traffic filters for that mobile node, access control lists of that mobile node, etc.). According to one embodiment of the invention the foreign agent specific information may be obtained from a pending table on the foreign agent 120 (e.g., from the local mobility agent Mobile IP structure 852 on the foreign agent 120). According to one embodiment of the invention the foreign agent specific information is encrypted in a manner such that the home agent 140 is unable to read the foreign agent specific information.

Thus, according to one embodiment of the invention, if Mobile IP session recover capability is supported at a home agent (e.g., as indicated according to the supported remote mobility agent(s) capabilities 862 of the peered foreign agent) and the peered foreign agent, upon a mobile node anchored at that home agent requesting Mobile IP services from that foreign agent (e.g., through a Mobile IP registration request message), the foreign agent dynamically and automatically triggers the transmission of foreign agent specific information associated with that mobile node to that home agent. Subsequent Mobile IP registration requests from different mobile nodes that are anchored at that home agent also trigger the transmission of foreign agent specific information associated with those mobile nodes to the home agent 140. It should also be understood that the home agent may be one of multiple home agents that is peered with the foreign agent. A similar process for each of the other ones of the home agents which support Mobile IP session recover capability is performed upon a Mobile IP registration request. In this fashion, the foreign agent 120 may cause the storage of recovery information in the form of foreign agent specific information on each of the peered home agents for which it is currently providing foreign agent service for (assuming that the peered home agents support Mobile IP session recover capability).

Figure 9:
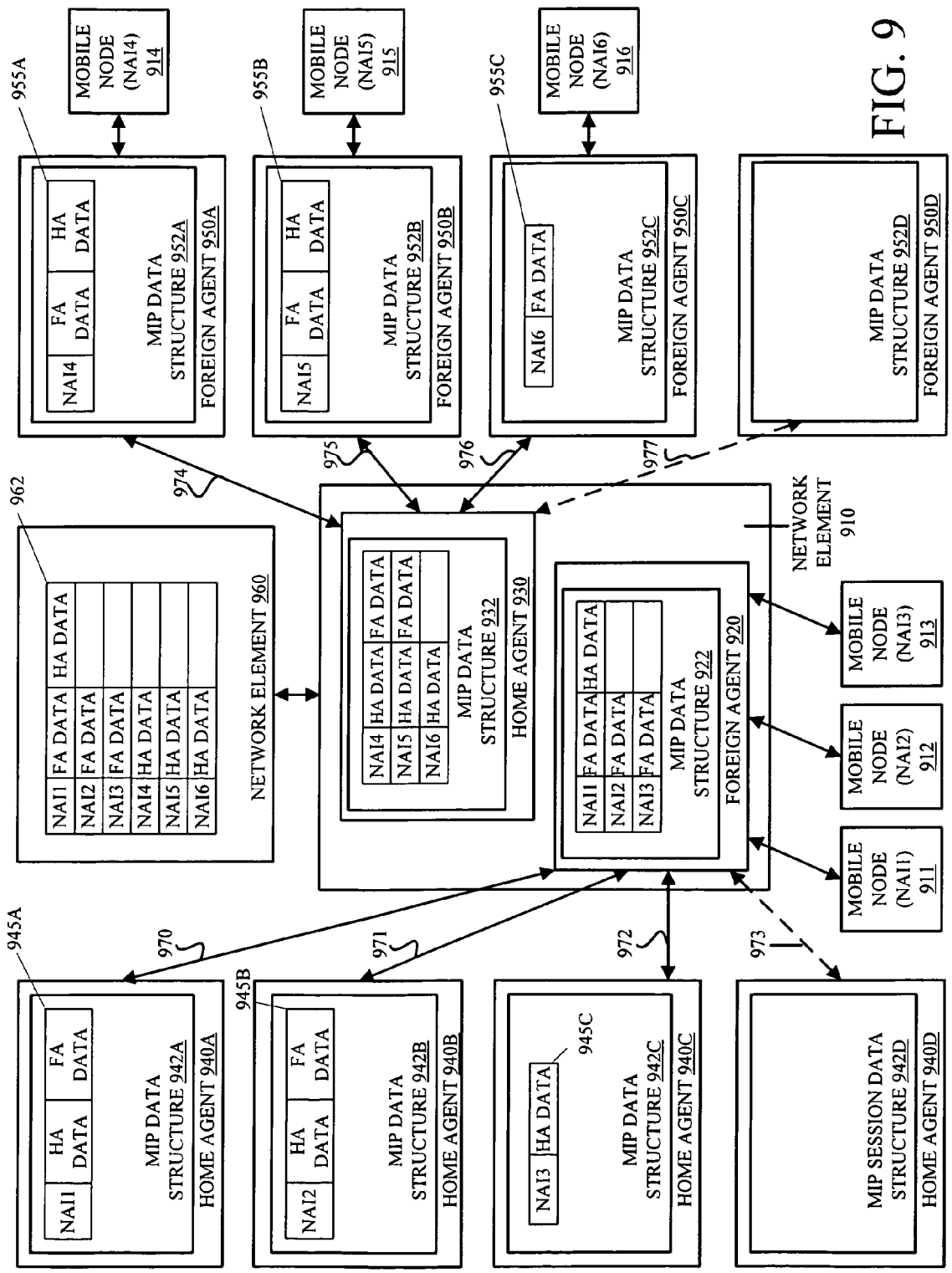
FIG. 9 illustrates dynamic distribution of recovery data for mobility agents in a Mobile IP network according to one embodiment of the invention.

Dynamic distribution of recovery information is illustrated in FIG. 9. Referring to FIG. 9, the network element 910 includes a foreign agent 920 and a home agent 930. The foreign agent 920 is peered with the home agents 940A-940D as indicated by the communication links 944A-944D. The communication link 944D is illustrated with a dashed line to indicate that although the home agent 940D is a peer of the foreign agent 920, the foreign agent 920 is not currently providing mobile services to any mobile node anchored at the home agent 940D. The foreign agent 920 is providing Mobile IP services to mobile node (NAI1) 911 anchored at the home agent 940A, the mobile node (NAI2) 912 anchored at the home agent 940B, and the mobile node (NAI3) anchored at the home agent 940C. The foreign agent 920 includes a Mobile IP data structure 922 that includes foreign agent information associated with the mobile nodes 911-913, and home agent specific information associated with the mobile node (NAI1) 911 from the home agent 940A.

The home agents 940A and 940B and the foreign agent 920 each support Mobile IP session recover capability (e.g., the home agents 940A and 940B negotiate Mobile IP session recover capability with the foreign agent 920 as described previously). According to one embodiment of the invention, even though a mobility agent supports Mobile IP session recover capability, that mobility agent may choose not to avail itself of that capability for its sessions. For example, in FIG. 9, the home agent 940B stores received mobility agent specific information from foreign agent 920 but does not transmit any session information pertaining to home agent 940B. A mobility agent may not desire or need to transmit mobility agent specific information to its peers (e.g., the mobility agent may employ a high availability recovery scheme), but still may choose to store remote mobility agent specific information.

According to one embodiment of the invention, when a mobile node requests Mobile IP services from a foreign agent (e.g., through a Mobile IP registration request message), the foreign agent appends the foreign agent specific information corresponding to that mobile node to the registration request and forwards it to the home agent serving as the anchor point for that mobile node. Thus, when the mobile node (NAI1) 911 requests Mobile IP services from the foreign agent 920, the foreign agent 920 appends the foreign agent specific information corresponding to mobile node (NAI1) 911 to the registration request and forwards it to the home agent 940A, which serves as the anchor point for the mobile node (NAI1) 911. Similarly, upon the mobile node (NAI1) 912 requesting Mobile IP services from the foreign agent 920, the foreign agent 920 transmits foreign agent specific information corresponding to the mobile node (NAI1) 912 to the home agent 940B. Each transmitted foreign agent specific information includes the data necessary for the foreign agent 920 to rebuild the session associated with the respective mobile node upon the foreign agent 920 losing the information associated with that session.

The home agents 940A and 940B each store the foreign agent specific information they have received in the Mobile IP data structure 942A and Mobile IP data structure 942B respectively. The Mobile IP data structure record 945A and 945B includes home agent specific information in the form of home agent data and foreign agent data respectively. The home agent data and the foreign agent data are associated with a particular mobile node (exemplary indicated by the mobile node's NAI). While the home agent data and the foreign agent data are shown to be associated as the same record (e.g., record 945A and 945B), the home agent data and the foreign agent data may be stored separately while maintaining an association to the respective mobile node.

The home agent 940C does not support Mobile IP session recover capability. Accordingly, the Mobile IP data structure 942C does not include foreign agent specific information associated with the mobile node (NAI3) 913. Thus, the record 945C does not include foreign agent data.

Referring back to FIG. 2, the home agent 140, in addition to processing the usual registration request (e.g., the packet processing module 810 authenticating the mobile node with use of the security module 820 and making a record for the mobile node 110 in the local mobility agent Mobile IP structure 852), stores the foreign agent specific information in its Mobile IP data structure 850 at operation 216. According to one embodiment of the invention the foreign agent specific information is stored in the remote mobility agent(s) Mobile IP structure 854 and is associated with the record for the mobile node 110. According to another embodiment of the invention, the foreign agent specific information is stored along with the record in the local mobility agent Mobile IP structure 852. Thus, the Mobile IP data structure 850 stores local mobility agent MIP information (e.g., home agent mobility bindings for the mobile node 110) and the received foreign agent specific information associated with the mobile node 110. According to another embodiment of the invention, the foreign agent specific information is stored in a separate structure and is associated with the record for the mobile node 110.

The home agent 140 transmits the usual registration reply message and piggybacks home agent 140 specific information to the foreign agent 120 at operation 218. The home agent 140 specific information is associated with the mobile node 110 (e.g., the home agent 140 specific information is derived from a record for the mobile node 110 in the local mobility agent Mobile IP structure 852). Similarly to the foreign agent specific information described previously, the home agent 140 specific information is opaque information (i.e., the home agent 140 specific information is useful only for the specific implementation of the home agent 140) and includes information necessary to rebuild the session associated with the mobile node 110 in the Mobile IP structure 852. The home agent 140 specific information may include the access circuit associated with the mobile node 110, an identifier of the mobile node 110 (e.g., MAC address, NAI, IP address), layer 2 information, layer 3 information, session username, timestamps, implementation specific information, security information (e.g., AAA), etc. Additionally, the home agent 140 specific information may include additional information pertaining to the mobile node 110 (e.g., QoS information, traffic filters, access control lists, etc.). According to one embodiment of the invention the home agent 140 specific information may be encrypted in a manner such that the foreign agent 120 is unable to read the home agent 140 specific information.

Referring to FIG. 9, the home agent 940A has transmitted home agent 940A specific information associated with the mobile node (NAI1) 911 to the foreign agent 920, and the foreign agent 920 has stored that information in the Mobile IP data structure 922.

The foreign agent 120, in addition to processing the registration reply as usual, stores the home agent 140 specific information in its Mobile IP data structure 850 at operation 220. According to one embodiment of the invention the home agent 140 specific information is stored in the remote mobility agent(s) Mobile IP structure 854 and is associated with the record for the mobile node 110. According to another embodiment of the invention, the foreign agent specific information is stored along with the record in the local mobility agent Mobile IP structure 852. Thus, the Mobile IP data structure 850 stores local mobility agent MIP information (e.g., mobile node 110 visitor information) and the received home agent 140 specific information associated with the mobile node 110. According to another embodiment of the invention, the home agent 140 specific information is stored in a separate structure and is associated with the record for the mobile node 110.

The foreign agent 120 transmits a registration reply as usual to the mobile node 110 thus completing the mobile node registration process at an operation 222. According to one embodiment of the invention, mobility agent specific extensions are removed prior to transmitting the registration reply message to the mobile node 110.

Sometime later, at an operation 224, the foreign agent 120 has suffered a failure and/or error which causes information stored in its local mobility agent Mobile IP data structure 852 to be lost (e.g., due to a restart, administrative error (e.g., an administrator has cleared the Mobile IP data structure), system error, etc.). According to one embodiment of the invention the foreign agent 120 does not employ high availability; thus upon the failure or error the foreign agent 120 has lost the information stored in its Mobile IP data structure 850 and cannot recover the information through high availability. However, the home agent 140 has stored the foreign agent specific information and this information may be used to reconstruct the Mobile IP data structure as will be described in greater detail later herein.

At an operation 226, the foreign agent 120 and the home agent 140 negotiates Mobile IP session recover capability a subsequent time. While not shown in FIG. 2, prior to the foreign agent 120 renegotiating Mobile IP session recover capability, the foreign agent 120 determines that the home agent 140 is a mobility agent peer. According to one embodiment of the invention, the list of static peers (e.g., mobility agents that have been manually and/or statically configured as peers of the foreign agent 120) is included in a static remote mobility agent structure on the foreign agent 120. For example, referring to FIG. 8, the static remote mobility agent structure 870 stores the static peer information. According to one embodiment of the invention, the static remote mobility agent structure 870 is not affected by the failure and/or error that caused the loss of information in the local mobility agent Mobile IP data structure 852. Thus, the foreign agent 120 may determine that the home agent 140 is a mobility agent peer with use of the static remote mobility agent structure 870.

If the home agent 140 is not indicated in the static remote mobility agent structure 870, then the home agent 140 may be a dynamic mobility agent peer. A dynamic mobility agent peer is a peer that is not manually and statically configured and is peered due to the request of the mobile node. For example, the mobile node 110 (anchored at the home agent 140, which is not included in the static remote mobility agent structure 870) may move to the foreign network of foreign agent 120 and request Mobile IP services. Upon successfully providing Mobile IP services to the mobile node, the foreign agent 120 and the home agent 140 are peered. Typically, if the failure and/or error causes the foreign agent 120 to restart, the foreign agent 120 loses knowledge of the dynamic mobility agent peers. According to one embodiment of the invention, determining dynamic mobility agent peers may be performed through use of the hello protocol, which is described in greater detail later herein. According to one embodiment of the invention the list of the dynamic mobility agent peers may be obtained from a remote database (e.g., AAA (authentication, authorization, accounting) server, policy server, etc.).

The Mobile IP session recover capability is negotiated after the failure or error as the foreign agent 120 may have different capabilities after the failure and/or error. For example, the foreign agent 120 prior to the failure and/or error may be running a version of software (e.g., 2.0) that includes the Mobile IP session recover capability but after the failure and/or error the foreign agent was required to restart with an older version of software (e.g., 1.0) that does not include the Mobile IP session recover capability. If the capability does not exist, then the recovery is handled as in the prior art. Thus, in one embodiment of the invention, the mobility agents do not assume that previous capabilities exist after a failure and/or error. According to another embodiment of the invention, the Mobile IP session recover capability is not negotiated after the failure and/or error if the failure and/or error did not cause a restart of the foreign agent 120.

Assuming that the foreign agent 120 and the home agent 140 support the Mobile IP session recover capability, the foreign agent 120 transmits a Mobile IP session recover request message to the home agent 140 at operation 228. The Mobile IP session recover request message requests information from the home agent 140 that will enable the foreign agent 120 to reconstruct its Mobile IP data structure (i.e., requests the stored foreign agent 120 specific information). The Mobile IP session recover request message may take the form as the previously described recovery message with one or more Mobile IP session recover request extensions (e.g., bulk Mobile IP session request extension, single Mobile IP session request extension for each session to be recovered). As the foreign agent 120 has suffered a failure and/or error and lost its Mobile IP session information, the foreign agent 120 likely sends a bulk Mobile IP session request extension if that capability is supported on the home agent 140.

Although not shown in FIG. 2, as previously discussed the foreign agent 120 may be peered with multiple home agents. If the foreign agent 120 lost all of its Mobile IP session information or a portion of that information, and cannot determine which of the home agents it has lost information about, the foreign agent 120 transmits a Mobile IP session recover request message to each of the peered home agents that support Mobile IP session recover capability. The foreign agent 120 may send Mobile IP session recover requests to the peers identified in the static peer structure 870 that support Mobile IP session recover capability (e.g., as identified in the supported remote mobility agent(s) capabilities 862), or to dynamic mobility agent peers identified through other means (e.g., through the hello protocol). For example, referring to FIG. 9, the foreign agent 920 sends a Mobile IP session recover request to home agent 940A and to home agent 940B respectively.

The home agent 140 processes the Mobile IP session recover request message and transmits a Mobile IP session recover reply message that includes the stored foreign agent specific information at operation 230. The Mobile IP session recover reply message may take the form as the previously described recovery message with a Mobile IP session recover extension (e.g., bulk Mobile IP session recover extension, single Mobile IP session recover extension). Thus, the home agent 140 transmits to the foreign agent 120 the necessary information for the foreign agent 120 to reconstruct its local mobility agent Mobile IP structure 852. The foreign agent 120 transmits to the home agent 140 an acknowledgement that it has received the recovery reply message at operation 232. The acknowledgement increases the reliability that the foreign agent 120 has received all of the stored foreign agent information. For example, if the home agent 140 does not receive an acknowledgement the home agent 140 may retransmit the Mobile IP session recover reply message. According to one embodiment of the invention, the number of times the Mobile IP session recover reply message is retransmitted is negotiated during the capabilities negotiation.

Referring to FIG. 9, the foreign agent 920 may receive the stored foreign agent information in the records 945A-945B of the home agents 940A-940B respectively. Note, that as the home agent 940C does not support Mobile IP session recover capability and does not store foreign agent 920 specific information, the foreign agent 920 does not receive foreign agent information from the home agent 940C.

Referring back to FIG. 2, the information received from the home agent 140 is used by the foreign agent 120 to reconstruct its local mobility agent Mobile IP structure 852 at operation 234. Thus, without using high availability (as previously described, some mobility agents may not employ high availability or want to utilize high availability due to its resource costs), the foreign agent 120 is able to recover its local mobility agent structure 852 with the information received from the home agent 140 (e.g., foreign agent 120 specific information associated with the mobile node 110) after a failure and/or error which caused the information in the structure to be lost. Referring to FIG. 9, the foreign agent 920 specific information received from the home agents 940A-940B may be used to reconstruct the Mobile IP data structure 922. Note that the Mobile IP information associated with the mobile node (NAI3) 913 cannot be recovered through use of the Mobile IP session recover capability. Thus, the information associated with the mobile node (NAI3) 913 may be recovered as is handled in the prior art, or as discussed with reference to FIG. 4.

Recovering Mobile IP information as described with regards to FIGS. 2, 8, and 9 allows for a more efficient use of resources than recovery via high availability. For example, as previously described, a separate standby mobility agent may be deployed in the Mobile IP network to provide high availability. However, recovering Mobile IP information as described with regards to FIGS. 2, 8, and 9 does not require a separate mobility agent nor a redundant storage, redundant processing, redundant line cards, etc. In addition, distributing mobile IP information to multiple nodes rather than a single node is a more efficient use of resources. In addition, distributing the recovery information to multiple locations diversifies the recovery information thereby reducing the risk of not being able to recover any of the information. For example, if all of the recovery information is stored in one location, and the recovery fails, then no information will be recovered. However, if the recovery information is stored in multiple locations and recovery fails in some of those locations, but is successful in at least some of the others, at least some of the information may be recovered.

Furthermore, a mobility agent is more inclined to store Mobile IP information of a remote mobility agent if that information is associated with a mobile node the mobility agent is providing Mobile IP service to (e.g., a customer of the mobility agent). For example, the home agent 940A may belong to service provider A, the home agent 940B may belong to service provider B, and the foreign agent 920 may belong to service provider C. Even though the home agent 940A and the foreign agent 920 may belong to different service providers, the home agent 940A may allow for storage of foreign agent 920 specific information associated with the mobile node (NAI) 911 (and vice versa) to allow for faster recovery for its customer (e.g., the mobile node 911) in case of an error. In other words, as the home agent 940A and the foreign agent 920 cooperate to provide Mobile IP services to the mobile node (NAI1) 911, the home agent 940A and the foreign agent 920 also may cooperate to provide recovery for the mobile node (NAI1) 911. However, as this capability costs resources of the home agent 940A (e.g., memory, processing, bandwidth, etc.) the home agent 940A may not allow storage of foreign agent 920 specific information associated with unrelated mobile nodes (e.g., the mobile node (NAI2) 912 anchored at the home agent 940B). In other words, as the home agent 940A is not associated with the mobile node (NAI2) 912 and does not belong to the same service provider as home agent 940B, the home agent 940A does not want to utilize its resources to provide recovery for another service provider's customer (e.g., mobile node (NAI2).

Additionally, while a notification message as described in IETF draft "draft-ietf-mip4-generic-notification-message-02.txt" may notify a mobility agent peer of something during a mobile session, the notification message cannot recover Mobile IP sessions, as the notification message is tied to an existing mobile session. In other words, the notification message is only useful for currently established sessions and cannot be used to recover sessions. Thus, upon a failure and/or error which causes Mobile IP information (including existence of mobile sessions) to be lost, the notification message cannot be used to recover Mobile IP sessions.

While not shown in FIG. 2, due to the failure or error of the foreign agent 120 the home agent 140 specific information stored in its local mobility agent Mobile IP structure 852 is also likely lost. Thus, in order for the foreign agent 120 to provide recovery capability for the home agent 140 (i.e., store the home agent 140 specific information), the home agent 140 is required to re-transmit the home agent 140 specific information to the foreign agent 120. Similarly in FIG. 9, the home agent 940A re-transmits the home agent 940A specific information to the foreign agent 920.

It should be understood, that although the operations performed in FIG. 2 are related to the foreign agent 120 recovering its local mobility agent Mobile IP structure 852, the operations may similarly be performed upon the home agent 140 recovering sessions. Thus, In FIG. 9, the home agent 930 is peered with the foreign agents 950A-950D over communication link 954A-954D respectively. The communication link 954D is a dashed line to indicate that although the foreign agent 950D is a peer of the home agent 930, the foreign agent 950D is not currently providing Mobile IP service to any mobile nodes anchored at the home agent 930. The foreign agents 950A-950C are providing Mobile IP service to the mobile nodes 914-916 respectively. Each of the mobile nodes 914-916 are anchored at the home agent 930. The foreign agents 950A-950B and the home agent 930 each support Mobile IP session recover capability. The foreign agent 950C does not support Mobile IP session recover capability. The home agent 930 includes Mobile IP data structure 932, which includes records for the mobile nodes 914-916 respectively (identified by the NAI of the mobile node). For the mobile node (NAI4) 914, the Mobile IP data structure 932 stores home agent 930 specific information and foreign agent 950A specific information. For the mobile node (NAI5) 915, the Mobile IP data structure 932 stores home agent 930 specific information and foreign agent 950B specific information. For the mobile node (NAI6) 916, the Mobile IP data structure 932 stores home agent 930 specific information. The foreign agent 950A stores in its Mobile IP data structure 952A foreign agent 950A specific information and received home agent 930 specific information as indicated by record 955A. The foreign agent 950B stores in its Mobile IP data structure 952B foreign agent 950B specific information and received home agent 930 specific information as indicated by record 955B. The foreign agent 950C stores in its Mobile IP data structure 952C foreign agent 950C specific information as indicated by record 955C.

Figure 3:
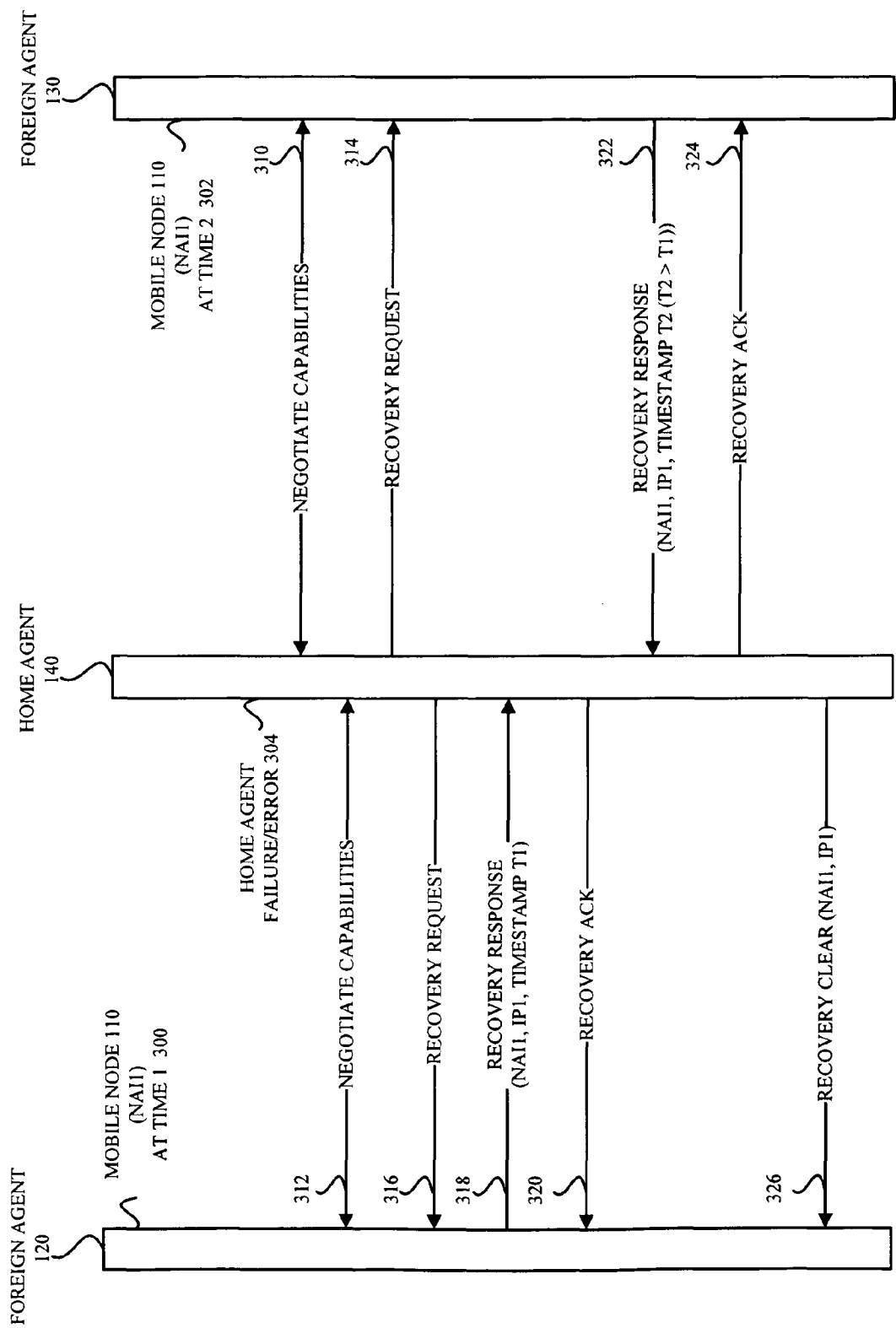
FIG. 3 is a data flow diagram illustrating Mobile IP session recovery where a mobile node is moving from one foreign agent to another foreign agent according to one embodiment of the invention.

FIG. 3 is a data flow diagram illustrating Mobile IP session recovery where a mobile node is moving from one foreign agent to another foreign agent according to one embodiment of the invention. In FIG. 3, the home agent 140 is coupled with the foreign agent 120 and the foreign agent 130. The foreign agent 120 and the foreign agent 130 are both peers of the home agent 140 (e.g., the foreign agent 120 and the foreign agent 134 each provides care-of-addresses for certain mobile nodes belonging to the home agent 140). At operation 300, the mobile node 110 (NAI=1) is associated with the foreign agent 120 at a time 1. At operation 302, the mobile node 110 (NAI=1) is associated with the foreign agent 120 at a time 2 (where time 2>time 1). Thus, the mobile node 110 has moved from the foreign agent 120 to the foreign agent 130. At an operation 304, the home agent 140 has suffered a failure and/or an error which has caused loss of information in its local mobility agent Mobile IP structure 852. Additionally, the home agent 140 was not able to notify the foreign agent 120 to stop providing Mobile IP service to the mobile node 110 prior to suffering the failure or error (e.g., through a registration revocation message). In addition, the lifespan associated with the Mobile IP information of the mobile node 110 has not expired on the foreign agent 120. Therefore, the foreign agent 120 continues to store Mobile IP information regarding the mobile node 110 (e.g., a binding for the mobile node 110).

As the foreign agent 120 and the foreign agent 130 are both peers of the home agent 140 (determining that the foreign agents 120 and 130 are peers is performed similarly as described previously herein), the home agent 140 negotiates capabilities with the foreign agent 130 at operation 310 and negotiates capabilities with the foreign agent 120 at operation 312. According to one embodiment of the invention, the home agent 140 recovers the information in the local Mobile IP structure 852 through means known in the prior art (e.g., through high availability). However, the home agent 140 would like to verify that the information in the recovered Mobile IP structure 852 is accurate. Thus, the capabilities negotiated may include Mobile IP session verify capability. If, however, the home agent 140 does not employ recovery methods known in the prior art (e.g., high availability), the capabilities negotiated include Mobile IP session recover capability. Additionally, the capabilities negotiated include Mobile IP session clear capability which is described in more detail later herein.

Once the capabilities are negotiated, the home agent 140 transmits a recovery request message where the action included in the message depends on whether the home agent 140 is verifying one or more sessions or recovering one or more sessions (e.g., bulk session recovery request, single session recovery request) to the foreign agent 130 at operation 314, and transmits a recovery request message (e.g., bulk session recovery request, single session recovery request) to the foreign agent 120 at operation 316. The foreign agent 120 transmits a recovery response message (e.g., bulk session recovery response, single session recovery response) to the home agent 140 at operation 318. If the recovery request message in operation 316 included the Mobile IP session recover action, the recovery response message in operation 318 includes foreign agent 120 specific information associated with the mobile node 110. The foreign agent 120 specific information indicates that the foreign agent 120 is providing service to the mobile node 110 and includes a timestamp (e.g., T1) of when the foreign agent 120 started providing service to the mobile node 110. The home agent 140 may rebuild its local mobility agent Mobile IP structure with the foreign agent 120 specific information received at operation 318.

If the recovery request message in operation 316 included the Mobile IP session verify action, the recovery response message in operation 318 includes information verifying that the foreign agent 120 is providing Mobile IP service to the requested mobile nodes. For example, if the recovery request is a single session recovery request for the mobile node 110, the foreign agent 120 replies with information verifying that the foreign agent 120 is providing Mobile IP service to the mobile node 110. If the recovery request is a bulk session recovery request, the foreign agent 120 replies with information verifying that the foreign agent 120 is providing Mobile IP services to any number of mobile nodes. In other words, the bulk session recovery request message requests verification for each mobile node anchored to the home agent that the foreign agent is providing Mobile IP services for. Included in the recovery response message in operation 318 is information uniquely identifying the mobile node and a time when the foreign agent 120 started providing service to the mobile node (e.g., NAI, IP address, and a timestamp). Note that this information is not opaque information specific to the foreign agent 120. The recovery response message in operation 318 indicates that the foreign agent 120 is providing Mobile IP services to the mobile node 110 and indicates a timestamp T1. The home agent 140 transmits an acknowledgement to the foreign agent 120 at operation 320.

Similarly to the foreign agent 120, the foreign agent 130 transmits a recovery response message where the action included in the message depends on whether the home agent 140 is verifying one or more sessions or recovering one or more sessions. The foreign agent 130 transmits a recovery response message (e.g., bulk session recovery response, single session recovery response) to the home agent 140 at operation 322. If the recovery request message in operation 314 included the Mobile IP session recover action, the recovery response in operation 322 includes foreign agent 130 specific information associated with the mobile node 110. The foreign agent 130 specific information indicates that the foreign agent 130 is providing service to the mobile node 110 and includes a timestamp (e.g, T2 (T2>T2)) of when the foreign agent 130 started providing service to the mobile node 110. The home agent 140 transmits an acknowledgement to the foreign agent 130 at operation 324. As the foreign agent 130 started providing service to the mobile node 110 at a later time than foreign agent 120, the home agent assumes that the mobile node 110 has moved from the foreign agent 120 to the foreign agent 130. Thus, the home agent 140 may rebuild its local mobility agent Mobile IP structure according to the foreign agent 130 specific information received at operation 322. For example, if the home agent 140 previously rebuilt the local mobility agent Mobile IP structure according to the foreign agent 120 specific information received at operation 318, the home agent 140 modifies the local mobility agent Mobile IP structure with the foreign agent 130 specific information.

If the recovery request message in operation 314 included the Mobile IP session verify action, the recovery response message in operation 322 includes information verifying that the foreign agent 130 is providing Mobile IP service to the requested mobile nodes in a similar fashion as described regarding the recovery response message in operation 318. Included in the recovery response message in operation 322 is information uniquely identifying the requested mobile nodes (if they exist) and a time when the foreign agent 130 started providing service to those mobile nodes (e.g., NAI, IP address, and a timestamp for each mobile node). Note that this information is not opaque information specific to the foreign agent 130. The recovery response message in operation 322 indicates that the foreign agent 130 is providing Mobile IP services to the mobile node 110 and indicates a timestamp T2, where T2 is greater than T1. The home agent 140 transmits an acknowledgement to the foreign agent 130 at operation 324.

Thus, at the time of operation 324 the home agent 140 has received recovery responses from two different foreign agents regarding the same mobile node (i.e., mobile node 110 as identified by the same NAI). As previously described, as the recovery response from the foreign agent 130 in operation 322 indicates that the foreign agent 130 started providing Mobile IP services to the mobile node 110 later in time then the foreign agent 120, the home agent 140 assumes that the mobile node 110 has moved from the foreign agent 120 to the foreign agent 130. Thus, the home agent 140 assumes that the foreign agent 120 no longer needs to store Mobile IP information for the mobile node 110. Thus, the home agent 140 transmits a recovery message with a Mobile IP session clear action to the foreign agent 120 at operation 326. This recovery message with the clear action directs the foreign agent 120 to remove the stored Mobile IP information associated with the mobile node 110. According to one embodiment of the invention, the recovery message includes authentication information which allows the foreign agent 120 to trust that the recovery message is from the home agent 140 and not an imposter. The foreign agent 120 may then clear the Mobile IP information associated with the mobile node 110. For example, the foreign agent 120 may clear the entry in its local mobility agent Mobile IP structure 852 corresponding to the mobile node 110. Additionally the foreign agent 120 may clear information that may be stored in the remote mobility agent(s) Mobile IP structure 854 corresponding to the mobile node 110. Therefore, the foreign agent 120 does not have to wait until a lifespan in the entry for the mobile node expires before removing the entry as the home agent 140 may direct the foreign agent to remove that entry.

It should be understood that the order of operations in FIG. 3 is exemplary. For example, the home agent 140 may receive the recovery response 322 from the foreign agent 130 prior to receiving the recovery response 318 from the foreign agent 120. However, it should be understood that the home agent 140 still rebuilds its local mobility agent Mobile IP structure according to the received foreign agent 130 specific information. For example, the home agent 140 may rebuild its local mobility agent Mobile IP structure with the received foreign agent 130 specific information at operation 322, and upon receiving the recovery response from the foreign agent 120 at operation 318, the home agent 140 determines that the foreign agent 120 has started providing Mobile IP services to the mobile node 110 at a later time than has the foreign agent 130. Thus, if the home agent 140 receives foreign agent specific information from multiple foreign agents regarding a single mobile node, regardless of the time the home agent 140 receives the foreign agent specific information, the home agent 140 rebuilds its local mobility agent Mobile IP structure according to whichever foreign agent started providing Mobile IP service to that mobile node latest in time.

Figure 4:
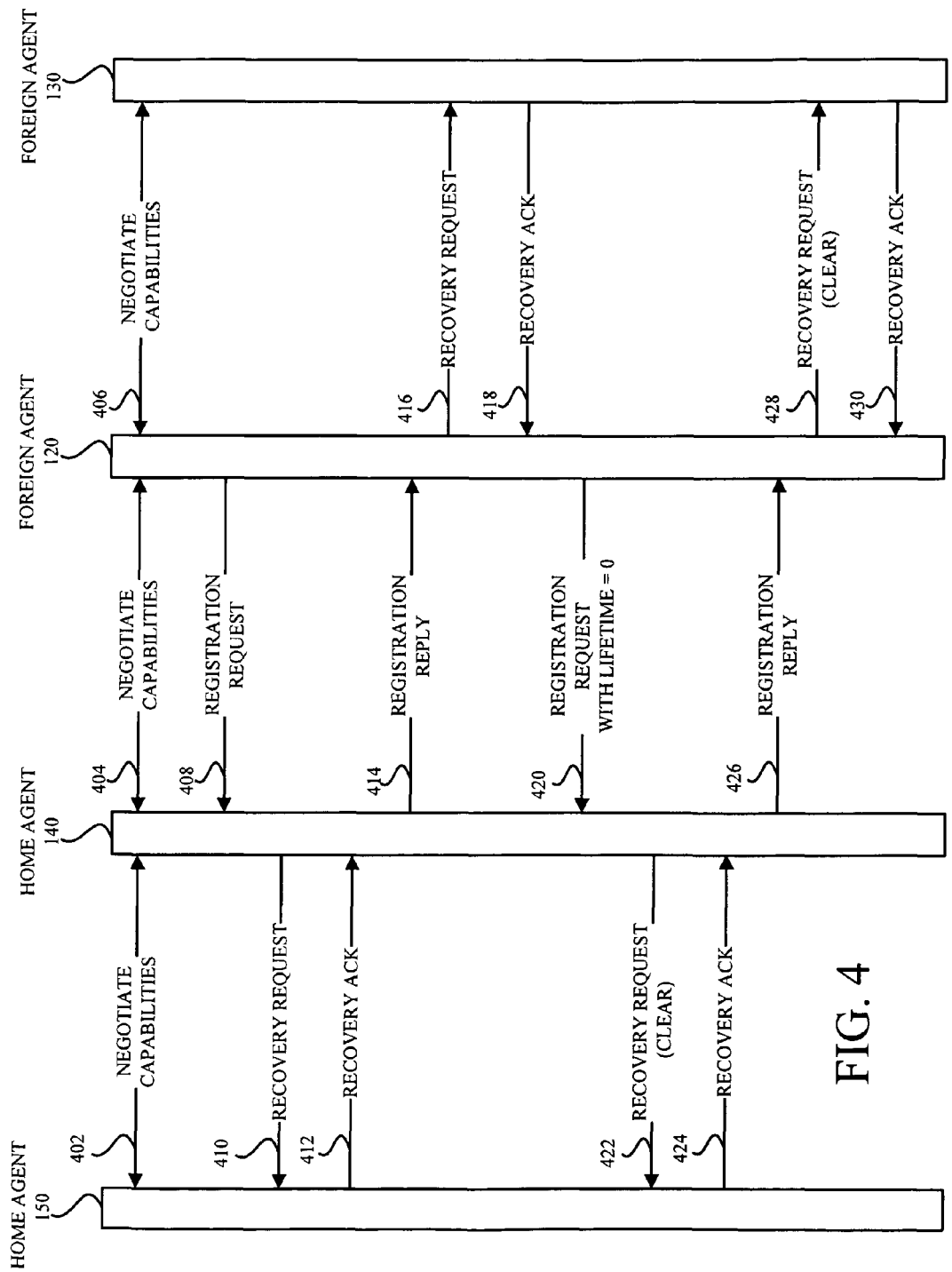
FIG. 4 is a data flow diagram illustrating Mobile IP session recovery in a Mobile IP network with backup agents and/or recovery partners according to one embodiment of the invention.

FIG. 4 is a data flow diagram illustrating Mobile IP session recovery in a Mobile IP network with backup agents and/or recovery partners according to one embodiment of the invention. In FIG. 4, the home agent 140 is coupled with the home agent 150 and the foreign agent 120. The foreign agent 120 is coupled with the home agent 140 and the foreign agent 130. Similarly to operation 210 in FIG. 2, the home agent 150 and the home agent 140 negotiate capabilities at operation 402, the home agent 140 and the foreign agent 120 negotiate capabilities at operation 404, and the foreign agent 120 and the foreign agent 130 negotiate capabilities at operation 406. According to one embodiment of the invention the home agent 150 is a backup of the home agent 140. For example, the home agent 150 stores a redundant copy of information included in the home agent 140 (which includes Mobile IP information). Similarly, according to one embodiment of the invention the foreign agent 130 is a backup of the foreign agent 120. For example, the foreign agent 130 stores a redundant copy of information included in the foreign agent 120.

At operation 408, the foreign agent 120 transmits a typical registration request (e.g., for a particular mobile node) message to the home agent. In addition to the usual processing of the registration request, the home agent 140 transmits a recovery message to the home agent 150 indicating that the home agent 150 should add an entry for that mobile node into its Mobile IP structure (e.g., binding structure) so as to maintain the redundancy between the home agent 150 and the home agent 140 at operation 410. At operation 412, the home agent 150 acknowledges the recovery message.

Once the home agent 140 receives the acknowledgement from the home agent 150, the home agent 140 assumes that the home agent 150 is in a redundant state. At operation 414, the home agent 140 transmits the usual registration reply message to the foreign agent 120. In addition to the usual processing of the registration reply message (e.g., adding an entry for that mobile node its Mobile IP structure) the foreign agent 120 transmits a recovery message to the foreign agent 130 indicating that the foreign agent 130 should add an entry for that mobile node into its Mobile IP structure so as to maintain the redundancy between the foreign agent 120 and the foreign agent 130. At operation 418, the foreign agent 130 acknowledges the recovery message.

Sometime later, at operation 420 the foreign agent 120 transmits a registration request with a lifetime equal to 0 (e.g., a registration revocation message) for a particular mobile node to the home agent 140. In addition to processing the registration request with a lifetime equal to 0 (e.g., removing the entry for that mobile node in its Mobile IP data structure), at operation 422 the home agent 140 transmits a recovery message with a clear action to the home agent 150 directing the home agent 150 to remove the entry for that mobile node from its Mobile IP data structure so as to maintain the redundancy between the home agent 150 and the home agent 140. The home agent 150 transmits an acknowledgement of the recovery message to the home agent 140 at operation 424.

Once the home agent 140 receives the acknowledgement from the home agent 150, the home agent 140 assumes that the home agent 150 is in a redundant state. At operation 426, the home agent 140 transmits a typical registration reply message to the foreign agent 120. In addition to processing the registration reply message (e.g., removing the entry for that mobile node its Mobile IP structure), at operation 428 the foreign agent 120 transmits a recovery message with a clear action to the foreign agent 130 indicating that the foreign agent 130 should remove the entry for that mobile node from its Mobile IP structure so as to maintain the redundancy between the foreign agent 120 and the foreign agent 130. At operation 430, the foreign agent 130 acknowledges the recovery message.

If the home agent 140 or the foreign agent 120 loses information in its Mobile IP structure, the home agent 140 or the foreign agent 120 may recover the information from the home agent 150 or the foreign agent 130 respectively in a similar fashion as described with reference to FIG. 2.

Referring to FIG. 9, the network element 960 is coupled with the network element 910 and acts as a backup for the network element 910 according to one embodiment of the invention. The network element 960 includes a structure 962 which stores information the network element 910 transmits. The structure 962 includes data from the home agent 930 and the foreign agent 920. The structure 962 includes at least the data specific to the foreign agent 920 and to the home agent 930 respectively. Additionally, the structure 962 may store remote mobility agent information transmitted to the foreign agent 920 and/or home agent 930. For example, the structure 962 home agent 940A specific information stored by the foreign agent 920. If the home agent 930 and/or the foreign agent 920 loses information in its Mobile IP structure, the home agent 930 and/or the foreign agent 920 may recover the information from the network element 960 in a similar fashion as described with reference to FIG. 2.

Referring back to FIG. 4, in some embodiments of the invention the home agent 150 is a recovery partner of the home agent 140 and similarly the foreign agent 130 is a recovery partner of the foreign agent 120. For example, during operation 408, the foreign agent 120 may forward the registration request to the home agent 140 and piggyback recovery data in the format of foreign agent specific information similarly as was described in operation 214 of FIG. 2. If the home agent 140 does not wish to store the foreign agent specific information locally (e.g., the home agent 140 does not have the internal resources available) yet wants to provide recovery services to the foreign agent 120, it may request its recovery partner (home agent 150) store the foreign agent specific information. Thus, the home agent 140 may transmit a recovery message to the home agent 150 requesting that the home agent 150 store the foreign agent specific information at operation 410. Similarly as described earlier, the home agent 150 acknowledges the recovery message.

At operation 414, the home agent 140 transmits the usual registration reply message to the foreign agent 120 and piggyback recovery data in the format of home agent specific information similarly as was described in operation 218 of FIG. 2. Similarly as described above in reference to the home agent recovery partner, the foreign agent 120 may request its recovery partner (foreign agent 130) store the home agent specific information. Thus, the foreign agent 120 may transmit a recovery message to the foreign agent 130 requesting that that foreign agent 140 store the home agent specific information at operation 416. At operation 418, the foreign agent 130 acknowledges the recovery message.

Sometime later, at operation 420 the foreign agent 120 transmits a registration request with a lifetime equal to 0 (e.g., a registration revocation message) for a particular mobile node to the home agent 140. In addition to processing the registration request with a lifetime equal to 0, at operation 422 the home agent 140 transmits a recovery message with a clear action to the home agent 150 directing the home agent 150 to remove the foreign agent specific information associated with that session. The home agent 150 transmits an acknowledgement of the recovery message to the home agent 140 at operation 424.

At operation 426, the home agent 140 transmits a typical registration reply message to the foreign agent 120. In addition to processing the registration reply message, at operation 428 the foreign agent 120 transmits a recovery message with a clear action to the foreign agent 130 directing that the foreign agent 130 remove the home agent specific information associated with that session. At operation 430, the foreign agent 130 acknowledges the recovery message.

Figure 5:
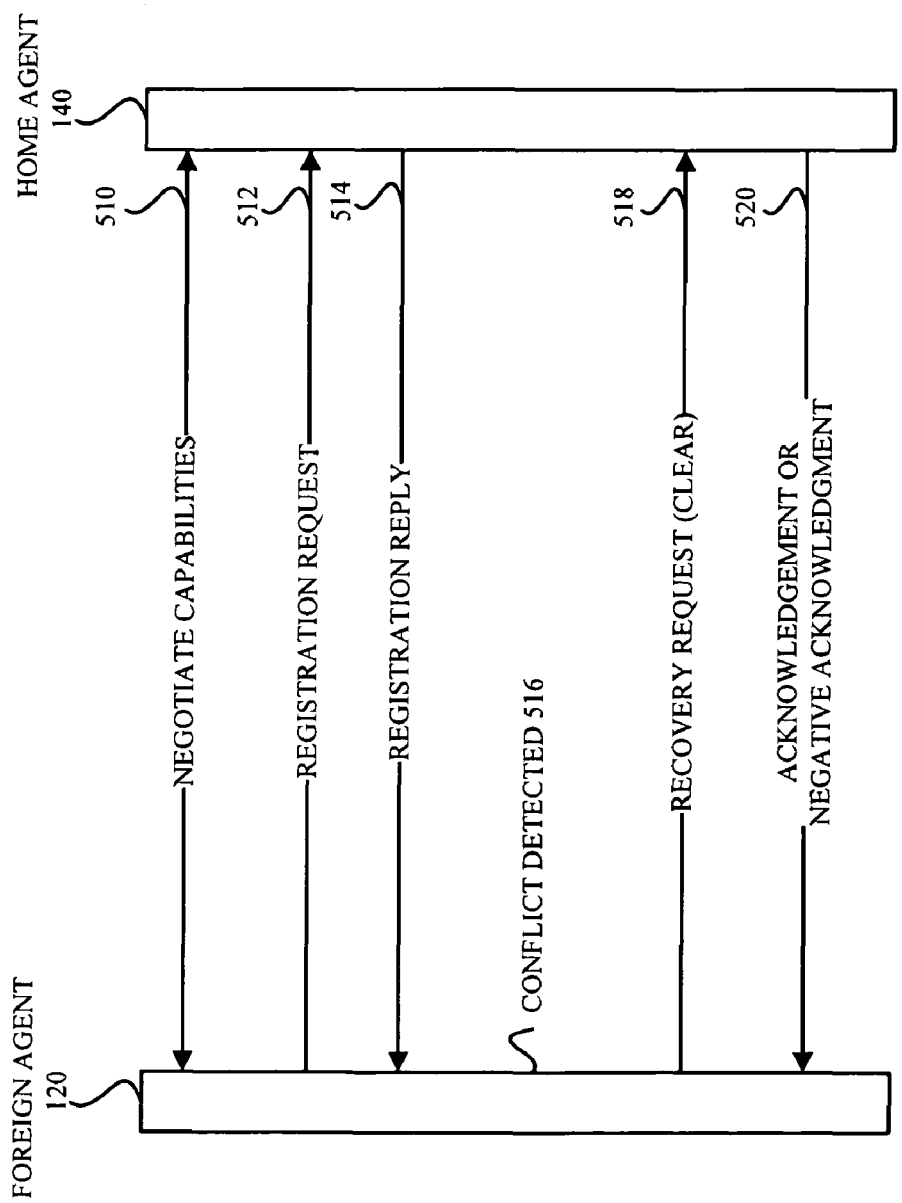
FIG. 5 is a data flow diagram illustrating Mobile IP session recovery where a Mobile IP conflict is detected at a mobility agent according to one embodiment of the invention.

FIG. 5 is a data flow diagram illustrating Mobile IP session recovery where a Mobile IP conflict is detected at a mobility agent according to one embodiment of the invention. In FIG. 5, the foreign agent 120 is a peer of the home agent 140. The operations 510, 512, and 514 are performed similarly as previously described with reference to operations 210, 214, and 218 as described in FIG. 2. The negotiated capabilities include at least the Mobile IP session clear capability.

During processing of the registration reply message, the foreign agent 120 detects a Mobile IP session conflict at operation 516. For example, in the local mobility agent Mobile IP structure of the foreign agent 120, a mobile node (e.g., M1) is currently associated with the IP address 1.2.3.4 (e.g., the home agent 140 has assigned the mobile node M1 to be associated with the IP address 1.2.3.4). However, a different mobile node (e.g., M2) is trying to register with the foreign agent 120 with the IP address 1.2.3.4 (e.g., the home agent 140 has assigned the mobile node M2 to be associated with the IP address 1.2.3.4). Thus the foreign agent does not know which mobile node should be associated with the IP address 1.2.3.4 (i.e., there is a conflict). According to one embodiment of the invention the foreign agent 120 may blindly accept the new registration and remove the old entry or blindly reject the new registration and keep the old entry.

According to another embodiment of the invention, the foreign agent 120 transmits a recovery message with a clear action to the home agent 140 upon detecting a conflict and the home agent 140 may decide which mobile node the IP address should be associated with (i.e., the home agent 140 may decide a resolution to the conflict). For example, at operation 518, the foreign agent 120 transmits a recovery message with a clear action to the home agent 140. In one embodiment of the invention the message directs the home agent 140 to remove the new mobile node from its Mobile IP data structure (e.g., the mobile node M2). The home agent 140 makes an independent decision whether to remove that mobile node from its Mobile IP data structure. If the home agent 140 decides to remove that mobile node from its Mobile IP data structure, the home agent 140 transmits an acknowledgement to the foreign agent 120 at operation 220. If the home agent 140 decides to keep that mobile node in its Mobile IP data structure, the home agent 140 transmits a negative acknowledgement (e.g., nak) to the foreign agent 120 at operation 220. The foreign agent 120 may then, depending on the message received from the home agent 140, remove the current mobile node from its Mobile IP data structure and add the new mobile node to the Mobile IP data structure, or reject the new mobile node's registration.

Thus the foreign agent 120 may intelligently manage Mobile IP session conflicts through use of recovery messaging. Furthermore, the foreign agent 120 may notify the home agent 140 of the conflict as the home agent 140 is likely unaware of the conflict. For example, the conflict could have arisen due to administrative error. The network administrator may clean the bindings (e.g., clear the Mobile IP structure) on the home agent 140 so the home agent believes that the address 1.2.3.4 is valid to assign. However, when the home agent 140 assigns the address 1.2.3.4 to a mobile node, it appears to the foreign agent 120 that two different mobile nodes are assigned to the same IP address (i.e., there is a conflict). Sending a recovery message with a clear action to the home agent allows the home agent to determine why the conflict exists and a resolution of the conflict (e.g., the home agent may direct the foreign agent as to which mobile node should be associated with that IP address).

Additionally, unlike a registration revocation message (as described in RFC 3543) which notifies a mobility agent peer that Mobile IP services have been stopped for a particular mobile session, a Mobile IP session clear message may direct a mobility agent peer to update or change values not directly associated with the mobile session (e.g., QoS parameters, AAA parameters, load balancing attributes, rate policies, etc.). For example, a home agent may transmit a Mobile IP session clear message to a foreign agent to direct that foreign agent to change rate policies (e.g., download/upload rate) such that the rate policies are consistent between the home agent and the foreign agent.

Figure 6:
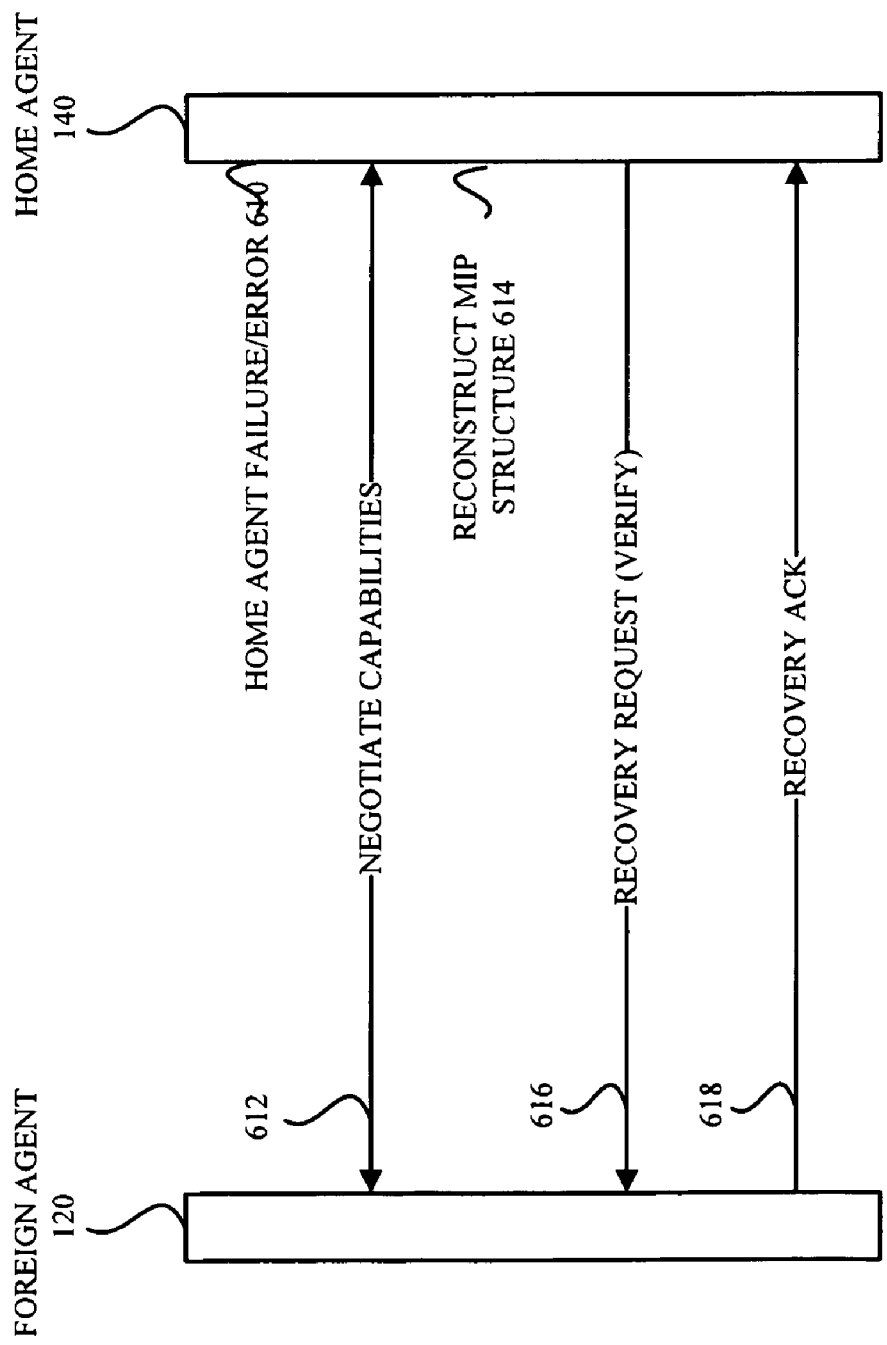
FIG. 6 is a data flow diagram illustrating verifying Mobile IP session(s) according to one embodiment of the invention.

FIG. 6 is a data flow diagram illustrating verifying Mobile IP session(s) according to one embodiment of the invention. In FIG. 6, the foreign agent 120 is a peer of the home agent 140. At an operation 610, the home agent has suffered a failure or error which causes information stored in its Mobile IP data structure to be lost (e.g., due to a restart, administrative error (e.g., an administrator has cleared the Mobile IP data structure), system error, etc.). The home agent 140 and the foreign agent 120 negotiate capabilities at operation 612 in a similar fashion as operation 210 described with reference to FIG. 2. The negotiated capabilities at least include Mobile IP session verify capability. At operation 614, the home agent 140 reconstructs its Mobile IP data structure (e.g., binding structure). According to one embodiment of the invention the home agent 140 reconstructs its Mobile IP data structure through high availability.

Although the Mobile IP data structure is restored, the home agent 140 does not know if the information stored in the Mobile IP data structure is accurate or current. For example, during the time that the home agent 140 was inoperable due to the failure or error, a mobile node may have left the network, changed foreign agents, etc. Thus, at operation 616 the home agent 140 transmits a recovery message with a verification action to the foreign agent 120. According to one embodiment of the invention the message is a bulk recovery request message while in other embodiments of the invention the message is a single session recovery request message. The foreign agent 120 transmits an acknowledgement to the home agent 140 for each verified Mobile IP session at operation 618 according to one embodiment of the invention. According to another embodiment of the invention the foreign agent 120 transmits a negative acknowledgement to the home agent 140 for each Mobile IP session that is not verified.

While FIG. 6 illustrates a home agent verifying Mobile IP sessions with a foreign agent, it should be understood that similar operations may be performed in regards to a home agent verifying Mobile IP sessions with another home agent, a foreign agent verifying Mobile IP sessions with a home agent, or a foreign agent verifying Mobile IP sessions with another foreign agent.

In addition, it should also be understood that verification may be performed on multiple mobility agents distributed throughout the Mobile IP network. For example, referring to FIG. 9, if the foreign agent 920 and/or the home agent 930 requests Mobile IP information stored in the network element 960 (e.g., after losing that Mobile IP information) the foreign agent 920 and/or home agent 930 may rebuild their respective Mobile IP data structure and further verify the rebuilt sessions with the mobility agent peers that support Mobile IP session verify capability. For example, upon the foreign agent 920 receiving Mobile IP information from the network element 960 and rebuilding or recovering information in the Mobile IP data structure 922, the foreign agent 920 verifies the rebuilt sessions. For example, if the home agents 940A-940C each support Mobile IP session verify capability, the foreign agent 920 may verify the sessions associated with the mobile nodes 911, 912, and 913 with the home agents 940A, 940B, and 940C respectively (e.g., through recovery message with a verification action and recovery acknowledgement message similar to operations 616 and 618 in reference to FIG. 6).

Figure 7:
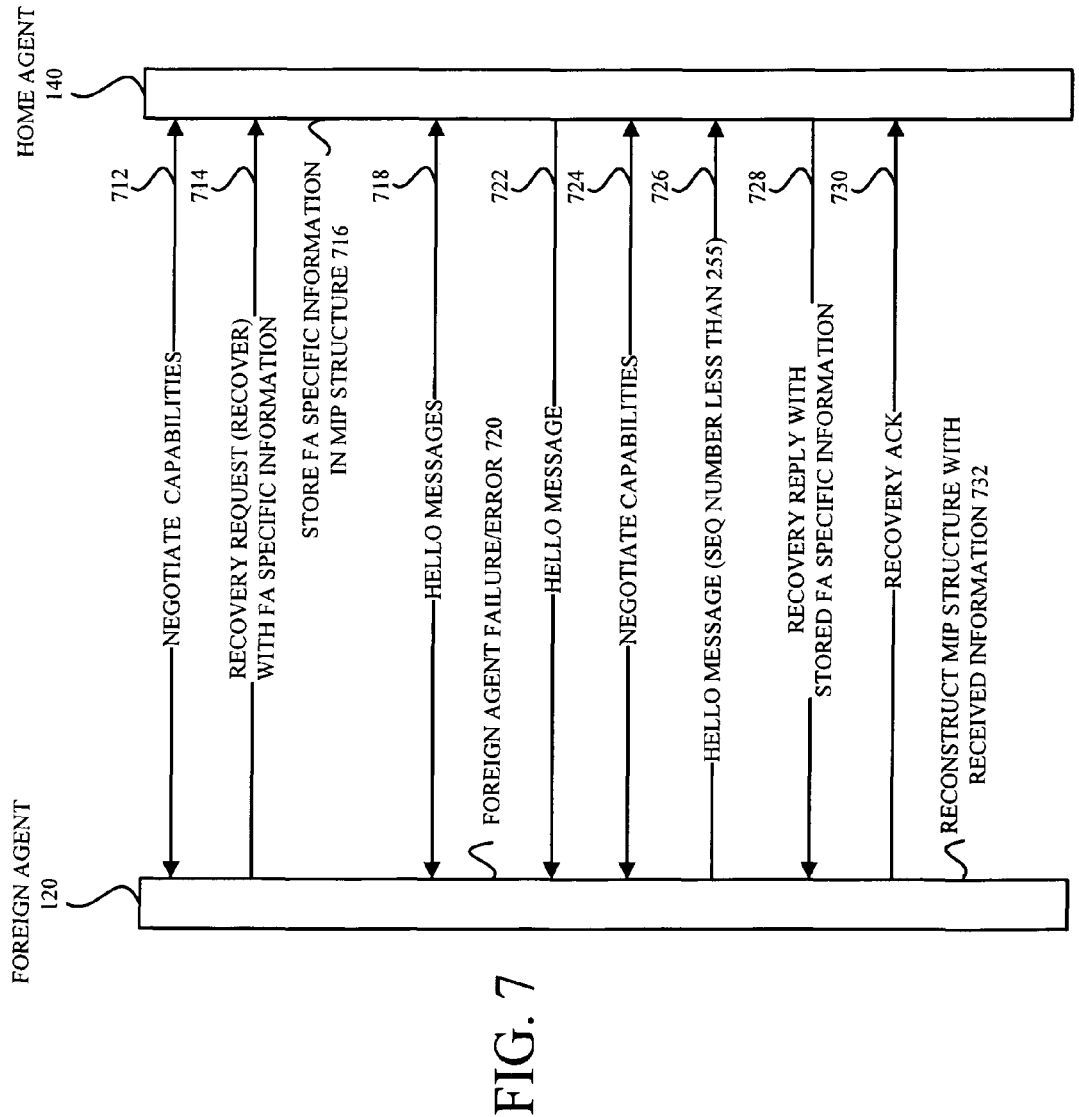
FIG. 7 is a data flow diagram illustrating a hello protocol capability in a Mobile IP network according to one embodiment of the invention.

FIG. 7 is a data flow diagram illustrating a hello protocol capability in a Mobile IP network according to one embodiment of the invention. In FIG. 7, the foreign agent 120 is a peer of the home agent 140. According to one embodiment of the invention the home agent 140 is a dynamic peer of the foreign agent 120. In other words the home agent 140 is not a static peer of the foreign agent 120 (e.g. the home agent 140 is not included in the static remote mobility agent structure 870 of the foreign agent 120). Typically, when a mobility agent restarts due to some error, the existence and identification of the static peers may be recovered; however the existence of the dynamically configured peers usually may not be recovered.

At operation 712, the foreign agent 120 and the home agent 140 negotiate capabilities similar to operation 210 described in reference to FIG. 2. The negotiated capabilities include at least hello protocol capability and Mobile IP session recover capability. Once the hello protocol is successfully negotiated, the foreign agent 120 and the home agent 140 may periodically exchange hello messages. Sometime later, at an operation 714, the foreign agent 120 transmits foreign agent 120 specific information to the home agent 140, and the home agent 140 stores the foreign agent specific information in its Mobile IP structure at operation 716. At operation 718 hello messages are transmitted between the foreign agent 120 and the home agent 140. According to one embodiment of the invention the hello messages enable fast detection of mobility agent failure. For example, if the foreign agent 120 stops transmitting hello messages to the home agent 140, the home agent 140 may assume that a failure has occurred on the foreign agent 120.

Sometime later, at operation 720, the foreign agent 120 has suffered a failure and/or error which causes information stored in its Mobile IP structure to be lost (e.g., due to a restart, administrative error (e.g., an administrator has cleared the Mobile IP data structure), system error, etc.). According to one embodiment of the invention the foreign agent 120 does not employ high availability thus upon the failure or error the foreign agent 120 has lost the information stored in its Mobile IP data structure 850 and cannot recover the information through high availability. However, the home agent 140 has stored the foreign agent specific information and this information may be used to reconstruct the Mobile IP data structure.

However, as the home agent 140 is a dynamic peer, upon the foreign agent 120 failing, the foreign agent 120 likely does not have knowledge that the home agent 140 is a peer. Thus, the foreign agent 120 would not know to request recovery of foreign agent specific information from the home agent 140. However, the home agent 140 continues to send hello messages to the foreign agent 120. At operation 722 such a hello message is received by the foreign agent 120. Upon receiving the hello message from the home agent 140, the foreign agent 120 determines that the home agent 140 must be a peer (e.g., the foreign agent must have previously negotiated the hello protocol capability with this home agent, and the foreign agent only negotiates with its peers). At an operation 724 the foreign agent 120 and the home agent 140 negotiate capabilities as similarly described with reference to operation 226 in FIG. 2. The negotiated capabilities include at least hello protocol capability and Mobile IP session recover capability.

At operation 726, the foreign agent 120 transmits a hello message with a sequence number less than 255. Typical hello packets have a sequence number over 255. Receiving a hello message with a sequence number less than 255 is a signal for the home agent 140 to transmit the stored foreign agent specific information to the foreign agent 120. Thus, at operation 728, the home agent 140 transmits the stored foreign agent specific information to the foreign agent 120 (e.g., through use of a recovery reply message). At an operation 730 the foreign agent 120 transmits an acknowledgement to the home agent 140. The foreign agent 120 reconstructs its Mobile IP data structure (e.g., a visitor structure) with the received information at an operation 732.

Thus, a hello protocol capability may be negotiated between two mobility agents. The hello protocol allows for faster detection of mobility agent failure. The hello protocol also may be used to determine any mobility agent peers that are dynamic peers (e.g., that are using dynamic tunnels). Additionally, the hello protocol may be used to signal mobility agents (e.g., a hello message with a sequence number less than 255) that recovery is requested.

In one embodiment of the invention capabilities are not negotiated between mobility agents. For example, if it can be assumed that each mobility agent supports a particular capability, then there that capability does not need to be negotiated. For example, if mobility agents in the Mobile IP network are from the same vendor or operate similarly (e.g., support similar software) then capabilities need not be negotiated. Additionally, if the mobility agent does not receive a recovery response message after a predefined number of recovery request messages (e.g., three messages) then the mobility agent assumes the capability is not supported.

In one embodiment of the invention whether capabilities are negotiated is determined by a configuration by a network administrator. For example, if it can be assumed that certain capabilities are supported by most mobility agents (e.g., commonly supported capabilities) the network administrator configures the mobility agent to not perform capabilities negotiation for those particular capabilities. On the other hand, if certain capabilities may not be supported by most mobility agents (e.g., rarely supported capabilities) the network administrator configures the mobility agent to perform capabilities negotiation for those particular capabilities.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method for recovering Mobile Internet Protocol (IP) sessions of a mobility agent in a Mobile IP network, comprising:

receiving at the mobility agent a first and second Mobile IP registration request message originating from a first and second mobile node respectively, wherein the first and second Mobile IP registration request messages indicate that the first and second mobile nodes request Mobile IP services in association with a first and second one of a plurality of mobility agent peers of the mobility agent in the Mobile IP network respectively, wherein the first and second Mobile IP registration requests are received dynamically depending on a location of the first and second mobile nodes in the Mobile IP network;

transmitting a first and second Mobile IP registration reply messages in response to providing Mobile IP services for the first and second mobile nodes;

storing, within a Mobile IP data structure of the mobility agent, one or more Mobile IP sessions, wherein a first session is associated with the first mobile node and a second session is associated with the second mobile node, wherein information of the Mobile IP sessions is specific to the mobility agent;

transmitting Mobile IP information derived from the first session to the first mobility agent peer, and transmitting Mobile IP information derived from the second session to the second mobility agent peer; and upon the mobility agent inadvertently losing the first and second sessions,
  requesting from the first and second mobility agent peers the Mobile IP information associated with the mobility agent,
  receiving at least a portion of the requested Mobile IP information, and
  reconstructing the first and second sessions from the received Mobile IP information.

2. The computer implemented method of claim 1, further comprising prior to transmitting the specific Mobile IP information associated with the first and second mode to the first and second mobility agent peer respectively, negotiating a set of one or more capabilities with the first and second mobility agent peer, wherein each capability represents a particular set of one or more operations providing functionality of an application feature, wherein the negotiated capabilities include Mobile IP session recover capability, wherein Mobile IP session recover capability is supported by the mobility agent and the first and second mobility agent peer.

3. The computer implemented method of claim 1, wherein the mobility agent is a foreign agent that provides to the first and second mobile node a care-of-address that indicates the first and second mobile node's current point of attachment for reachability, and wherein the first and second mobility agent peer are each home agents, wherein the first mobility agent peer assigns a home address to the first mobile node and the second mobility agent peer assigns a home address to the second mobile node.

4. The computer implemented method of claim 1, wherein the mobility agent is a home agent that assigns to each of the first and second mobile nodes a home address, and wherein the first and second mobility agent peers are each foreign agents, wherein the first mobility agent peer provides a care-of-address for the first mobile node and the second mobility agent peer provides a care-of-address for the second mobile node.

5. The computer implemented method of claim 4, further comprising,
  upon receipt of a message originating from the first mobile node indicating the first mobile node no longer requires the mobility agent to provide Mobile IP services, the mobility agent removing the first Mobile IP session;
  receiving at the mobility agent a third Mobile IP registration request from the first mobile node, wherein the third Mobile IP registration request indicates that the first mobile node is requesting Mobile IP services in association with a third mobility agent peer, wherein the third mobility agent peer is a foreign agent, and wherein the third Mobile IP registration request is at a later time than the first Mobile IP registration request;
  transmitting a Mobile IP registration reply in response to granting the Mobile IP registration reply and providing Mobile IP services to the first mobile node;
  storing within the Mobile IP session data structure of the mobility agent, a third Mobile IP session associated with the first mobile node;
  transmitting Mobile IP information derived from the third Mobile IP session to the third mobility agent peer; and
  upon the mobility agent inadvertently losing its Mobile IP sessions,
    requesting from the plurality of mobility agent peers Mobile IP session information associated with the mobility agent,
    receiving from the first mobility agent peer Mobile IP information that was transmitted by the mobility agent that is associated with the first mobile node, and receiving from the third mobility agent peer Mobile IP information that was transmitted by the mobility agent that is associated with the first mobile node,
    determining that the third mobility agent peer is providing Mobile IP services to the first mobile node and the first mobility agent peer is no longer providing Mobile IP services to the first mobile node,
    reconstructing the Mobile IP data structure to recover the third Mobile IP session, and
    directing the first mobility agent peer to remove Mobile IP information associated with the first mobile node.

6. The computer implemented method of claim 1, wherein the requesting from the first and second mobility agent peer Mobile IP information associated with the mobility agent is performed via a hello packet that is transmitted by the mobility agent that indicates the mobility agent has lost the mobile IP information stored in the Mobile IP data structure.

7. The computer implemented method of claim 1, further comprising,
  removing the second session upon the mobility agent no longer providing Mobile IP services to the second mobile node;
  upon the mobility agent again inadvertently losing its stored Mobile IP sessions,
    requesting from the plurality of mobility agent peers Mobile IP session information they have associated with the mobility agent,
    receiving from the first mobility agent peer Mobile IP information associated with the mobility agent, and
    reconstructing the first session with the received Mobile IP information.

8. The computer implemented method of claim 1, wherein Mobile IP information derived from the Mobile IP data session is transmitted along with the Mobile IP registration reply message.

9. The computer implemented method of claim 1, further comprising prior to transmitting the Mobile IP information to the first and second mobility agent peer, encrypting the Mobile IP information in such a way that it is intended that the first and second mobility agent cannot read the Mobile IP information, and upon receipt of the Mobile IP information from at least one of the plurality of mobility agents, decrypting the Mobile IP information.

* * * * *

UNITED STATES PATENT AND TRADEMARK OFFICE
CERTIFICATE OF CORRECTION

PATENT NO. : 7,948,871 B2  
APPLICATION NO. : 12/055311  
DATED : May 24, 2011  
INVENTOR(S) : Balasubramanian et al.

Page 1 of 1

It is certified that error appears in the above-identified patent and that said Letters Patent is hereby corrected as shown below:

In Column 9, Line 32, below "format:", delete " ⎡ 0 1 1 3 4 5 6 7 8 9 Type ⎤ " and insert -- ⎡ 0 0 1 2 3 4 5 6 7 8 9 Type ⎤ --, therefor.

In Column 14, Line 49, delete "(NAI1)" and insert -- (NAI2) --, therefor.

In Column 14, Line 52, delete "(NAI1)" and insert -- (NAI2) --, therefor.

In Column 21, Line 42, delete "(T2>T2))" and insert -- (T2>T1)) --, therefor.

Signed and Sealed this  
Twenty-second Day of November, 2011

David J. Kappos  
*Director of the United States Patent and Trademark Office*